(12) United States Patent
McCoy, Jr. et al.

(10) Patent No.: US 11,964,830 B2
(45) Date of Patent: Apr. 23, 2024

(54) SUCTION GRIPPER CLUSTER DEVICE FOR MATERIAL SORTING AND OTHER APPLICATIONS

(71) Applicant: AMP Robotics Corporation, Louisville, CO (US)

(72) Inventors: John C. McCoy, Jr., Thornton, CO (US); James A. Bailey, Boulder, CO (US); Carter J. Schultz, Lafayette, CO (US); Matanya B. Horowitz, Golden, CO (US); Mark Baybutt, Superior, CO (US); Cameron D. Douglas, Boulder, CO (US)

(73) Assignee: AMP Robotics Corporation, Louisville, CO (US)

( * ) Notice: Subject to any disclaimer, the term of this patent is extended or adjusted under 35 U.S.C. 154(b) by 393 days.

(21) Appl. No.: 17/122,929

(22) Filed: Dec. 15, 2020

(65) Prior Publication Data

US 2021/0179366 A1 Jun. 17, 2021

Related U.S. Application Data

(60) Provisional application No. 62/948,397, filed on Dec. 16, 2019.

(51) Int. Cl.
*B65G 47/91* (2006.01)
*B25J 13/08* (2006.01)
(Continued)

(52) U.S. Cl.
CPC ............ *B65G 47/918* (2013.01); *B25J 13/08* (2013.01); *B25J 15/0666* (2013.01);
(Continued)

(58) Field of Classification Search
CPC ......... B07C 5/363; B07C 5/367; B07C 5/368; B07C 5/342; B25J 15/065; B25J 15/0658;
(Continued)

(56) References Cited

U.S. PATENT DOCUMENTS

| 3,774,778 | A | * | 11/1973 | Flaig | .................... B65G 47/918 |
| | | | | | 53/247 |
| 4,648,588 | A | * | 3/1987 | Carrell | ..................... B25J 15/02 |
| | | | | | 271/108 |

(Continued)

FOREIGN PATENT DOCUMENTS

| CA | 3071944 | | 3/2019 | | |
| DE | 19544490 A1 | * | 6/1997 | ............. | B21D 43/18 |

(Continued)

*Primary Examiner* — Patrick H Mackey
(74) *Attorney, Agent, or Firm* — Van Pelt, Yi & James LLP

(57) ABSTRACT

Using a suction gripper cluster device is disclosed, including: causing airflows to be generated by a plurality of airflow generators of a respective plurality of suction gripper mechanisms included in a suction gripper cluster device comprising a plurality of suction gripper mechanisms, wherein the plurality of airflow generators is configured to cause the airflows to enter respective intake ports of the plurality of suction gripper mechanisms and exit respective outlet ports of the respective plurality of suction gripper mechanisms in response to receiving air at a respective air input port of the respective plurality of suction gripper mechanisms; causing a target object to be captured by the suction gripper cluster device using the airflows; activating a positioning actuator mechanism to position the suction gripper cluster device; and causing the target object to be ejected from the suction gripper cluster device.

22 Claims, 18 Drawing Sheets

(51) Int. Cl.
*B25J 15/06* (2006.01)
*B25J 9/00* (2006.01)
*B25J 9/16* (2006.01)

(52) U.S. Cl.
CPC ............. *B65G 47/917* (2013.01); *B25J 9/003* (2013.01); *B25J 9/1697* (2013.01)

(58) Field of Classification Search
CPC ...... B25J 15/0675; B25J 15/066; B25J 13/08; B65G 47/917; B65G 47/918; B65G 47/91
USPC .......................................................... 209/643
See application file for complete search history.

(56) References Cited

U.S. PATENT DOCUMENTS

| | | | |
|---|---|---|---|
| 4,732,513 A | 3/1988 | Lenhart | |
| 5,037,245 A | 8/1991 | Smith | |
| 5,209,387 A | 5/1993 | Long | |
| 5,242,059 A | 9/1993 | Low et al. | |
| 5,299,693 A | 4/1994 | Ubaldi | |
| 5,423,431 A | 6/1995 | Westin | |
| 5,628,409 A | 5/1997 | Thomas | |
| 5,636,887 A | 6/1997 | Petropoulos | |
| 5,865,487 A * | 2/1999 | Gore | B25J 15/06 294/86.41 |
| 6,068,317 A * | 5/2000 | Park | H01L 21/68 414/752.1 |
| 6,124,560 A | 9/2000 | Roos | |
| 6,244,640 B1 | 6/2001 | Le Bricquer | |
| 6,313,422 B1 | 11/2001 | Anibas | |
| 6,439,631 B1 * | 8/2002 | Kress | B65G 47/918 414/754 |
| 6,979,032 B2 * | 12/2005 | Damhuis | B65G 47/917 294/185 |
| 7,263,890 B2 | 9/2007 | Takahashi | |
| 8,615,123 B2 | 12/2013 | Dabic | |
| 8,777,284 B2 | 7/2014 | Schaller | |
| 8,855,818 B2 * | 10/2014 | Hashimoto | B65G 47/918 700/250 |
| 8,892,148 B2 | 11/2014 | Bhaskaran | |
| 9,334,128 B2 * | 5/2016 | Milhau | B65G 47/917 |
| 10,118,300 B2 | 11/2018 | Wagner | |
| 10,207,296 B2 | 2/2019 | Garcia | |
| 10,370,202 B2 | 8/2019 | Hukelmann | |
| 10,625,304 B2 | 4/2020 | Kumar | |
| 10,710,119 B2 | 7/2020 | Kumar | |
| 10,722,922 B2 | 7/2020 | Kumar | |
| 10,814,498 B2 * | 10/2020 | Wagner | B25J 15/065 |
| 11,465,008 B2 | 10/2022 | Draper | |
| 2006/0054774 A1 | 3/2006 | Yassour | |
| 2007/0278139 A1 | 12/2007 | Cowling | |
| 2009/0272624 A1 | 11/2009 | Edwards | |
| 2012/0116572 A1 | 5/2012 | Corak | |
| 2012/0319416 A1 | 12/2012 | Ellis | |
| 2013/0168301 A1 | 7/2013 | Dell Endice | |
| 2016/0136816 A1 | 5/2016 | Pistorino | |
| 2017/0232479 A1 | 8/2017 | Pietzka | |
| 2018/0186012 A1 | 7/2018 | Regan | |
| 2019/0070734 A1 | 3/2019 | Wertenberger | |
| 2019/0084012 A1 | 3/2019 | McCoy, Jr. | |
| 2019/0134827 A1 | 5/2019 | Wagner | |
| 2019/0374978 A1 | 12/2019 | Borrell | |
| 2020/0290088 A1 | 9/2020 | Kumar | |
| 2020/0368786 A1 | 11/2020 | Kumar | |
| 2021/0061588 A1 * | 3/2021 | Lukka | B65G 47/911 |
| 2021/0229133 A1 | 7/2021 | Kumar | |
| 2021/0346916 A1 | 11/2021 | Kumar | |
| 2022/0016675 A1 | 1/2022 | Kumar | |
| 2022/0023918 A1 | 1/2022 | Kumar | |

FOREIGN PATENT DOCUMENTS

| | | | |
|---|---|---|---|
| WO | 2019207201 | 10/2019 | |
| WO | WO-2019207201 A1 * | 10/2019 | ............... B07C 5/00 |

\* cited by examiner

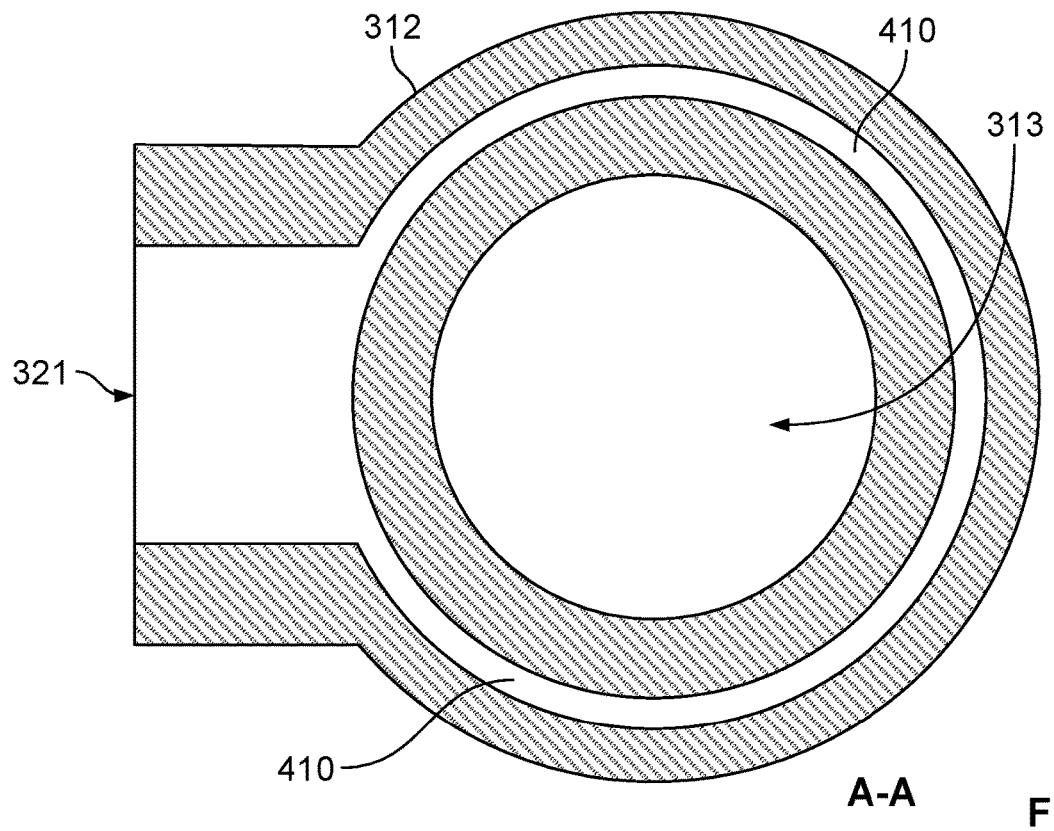
A-A  FIG. 4A
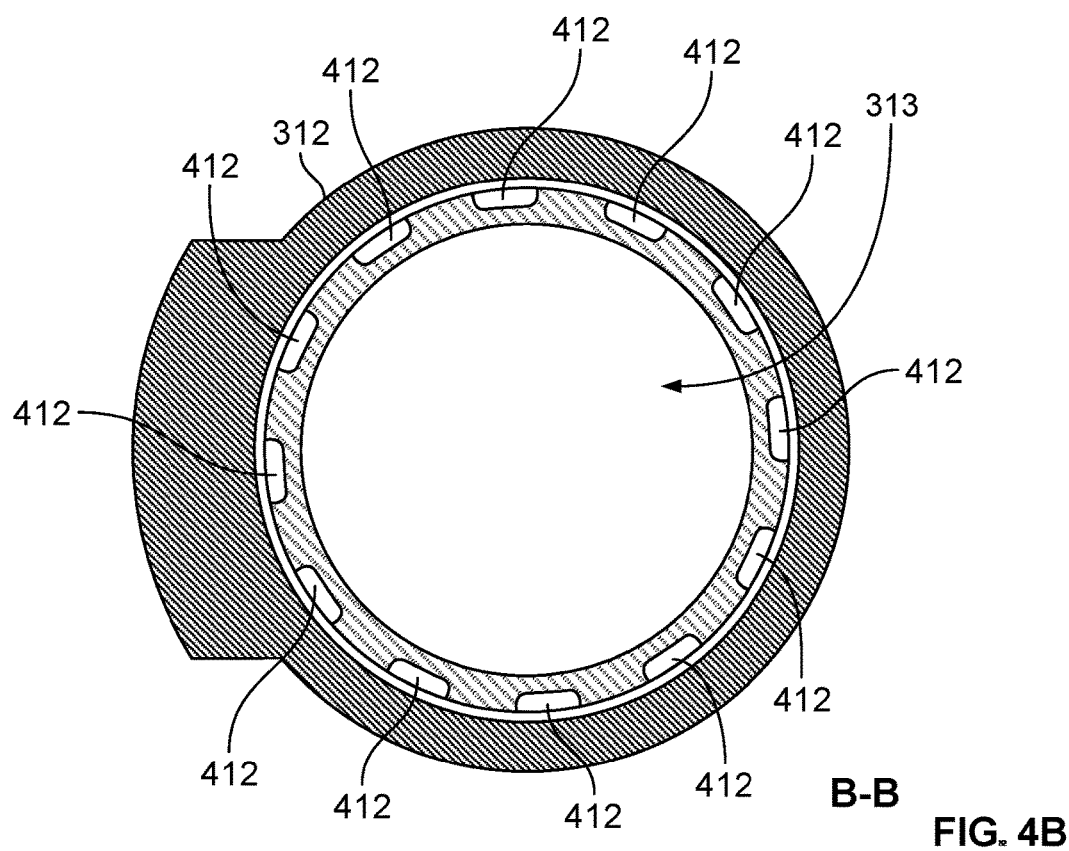
B-B  FIG. 4B

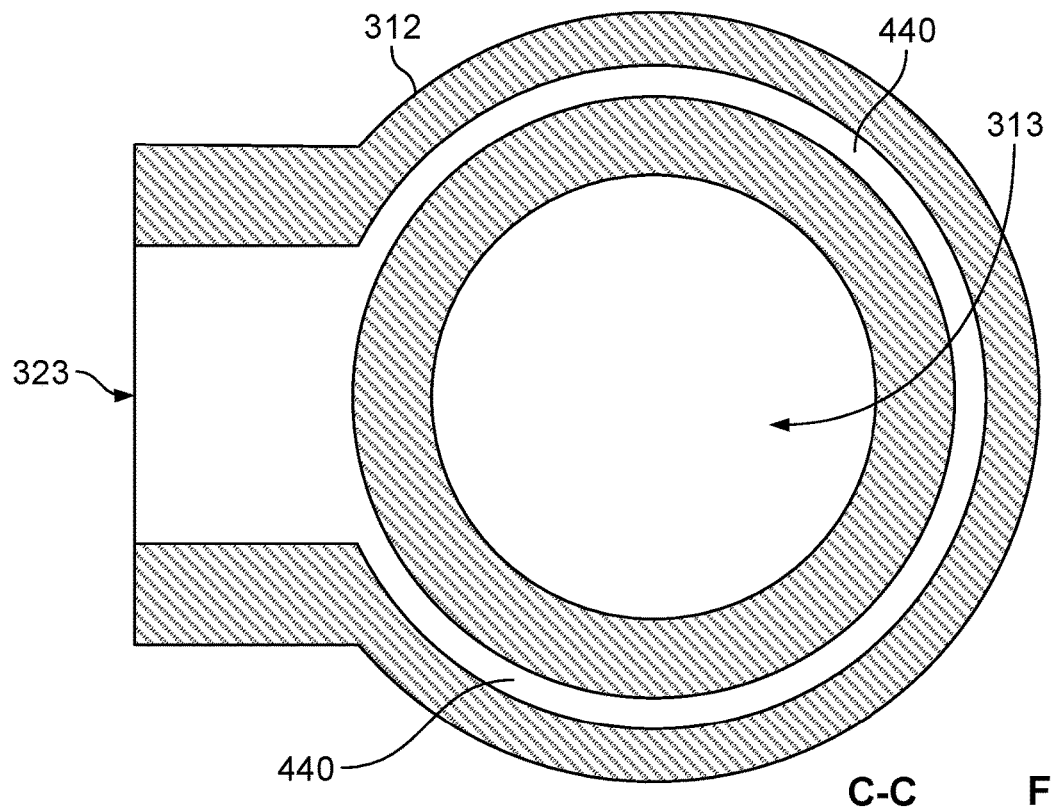
C-C    FIG. 4C
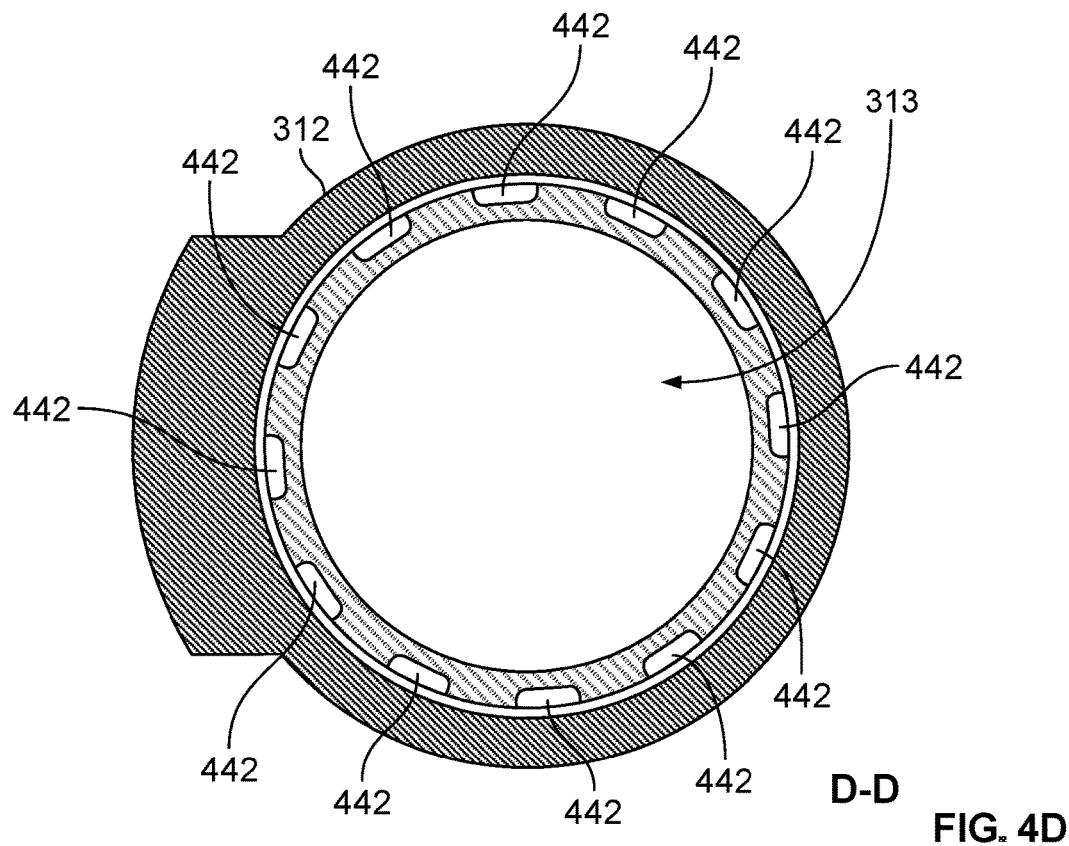
D-D    FIG. 4D

SUCTION GRIPPER CLUSTER DEVICE FOR MATERIAL SORTING AND OTHER APPLICATIONS

CROSS REFERENCE TO OTHER APPLICATIONS

This application claims priority to U.S. Provisional Patent Application No. 62/948,397 entitled SYSTEMS AND METHODS FOR MULTIPLE-HEADED AIRFLOW MOTIVATED MATERIAL SORTING filed Dec. 16, 2019 which is incorporated herein by reference for all purposes.

BACKGROUND OF THE INVENTION

Within many industrial facilities, objects are transported on conveyor belts from one location to another. Often a conveyor belt will carry an unsorted mixture of various objects and materials. Within recycling and waste management facilities for example, some of the conveyed objects may be considered desirable (e.g., valuable) materials while others may be considered undesirable contaminants. For example, the random and unsorted contents of a collection truck may be unloaded at the facility onto a conveyor belt. Although sorting personnel may be stationed to manually sort materials as it is transported on the belt, the use of sorting personnel is limiting because they can vary in their speed, accuracy, and efficiency and can suffer from fatigue over the period of a shift. Human sorters also require specific working conditions, compensation, and belt speeds. Production time is lost to training the many new employees that enter as sorters, and operation costs increase as injuries and accidents occur.

For the reasons stated above and for other reasons stated below which will become apparent to those skilled in the art upon reading and understanding the specification, there is a need in the art for systems and methods for multiple-headed airflow motivated material sorting.

BRIEF DESCRIPTION OF THE DRAWINGS

Various embodiments of the invention are disclosed in the following detailed description and the accompanying drawings.

Embodiments of the present disclosure can be more easily understood and further advantages and uses thereof more readily apparent, when considered in view of the description of the preferred embodiments and the following figures in which:

FIGS. 4, 4A, 4B, 4C and 4D are cross-sectional illustrations of an example air conveyor device in accordance with some embodiments.

In accordance with common practice, the various described features are not drawn to scale but are drawn to emphasize features relevant to the present disclosure. Reference characters denote like elements throughout figures and text.

DETAILED DESCRIPTION

Figure 1:
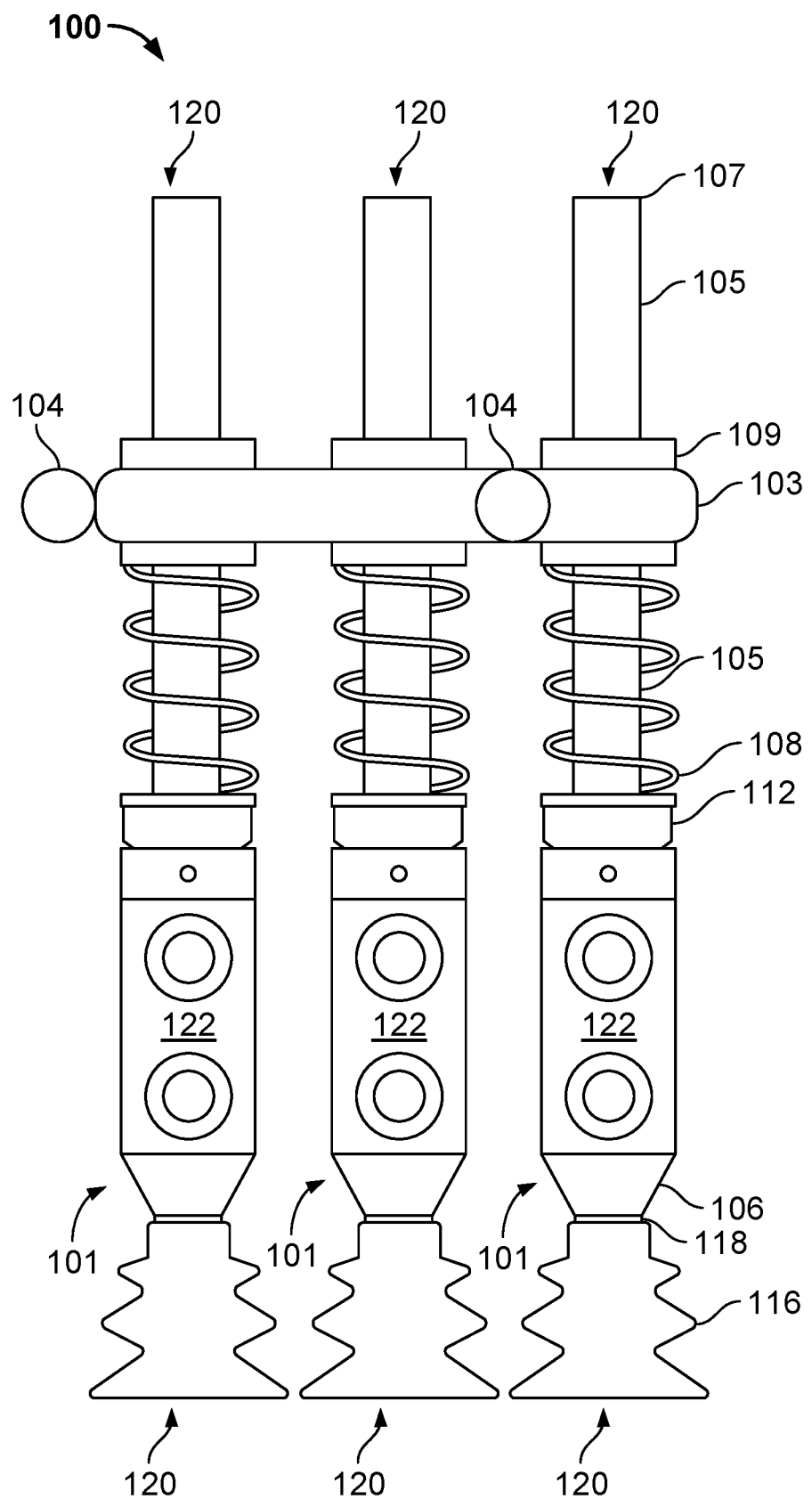
FIG. 1 is a diagram of an embodiment of a suction gripper cluster device.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The introduction of sorting systems (such as robotic systems, for example) for sorting materials has led to increased productivity and decreased contamination for Material Recovery Facilities (MRFs). Robots and similar systems have been utilized as a viable replacement, or supplement, for human sorters due to their speed, reliability, and durability. The objective of sorting systems is to recover the specific target material(s) and eject them into bunkers without introducing other materials (contaminants) into the sorted bunkers. A common technique used by these sorting systems to grasp target materials involves the use of a dynamically positioned suction gripper. Suction grippers are mechanisms used to pick up and move objects by applying a concentrated vacuum to a portion of an object's surface with sufficient vacuumed strength to capture an object and hold the object to the gripper. For example, a suction gripper can apply a substantial suction force to a target object so as to capture a target object off from a conveyor belt. Once the object is captured, the suction gripper can be repositioned and operated to release the object into a material deposit location.

As would be appreciated particularly for waste and material recovery facilities, the target objects which need to be removed from the conveyer belt can be dirty, crushed, and/or folded, making it difficult for a suction gripper to create a good seal on the object to allow it to secure and lift the target object off from the conveyer belt. Moreover, target objects can be expected to be arranged on the conveyor mechanisms in arbitrary orientations. As such, when a suction gripper is actuated and attempts to apply its suction force onto the target object, the surface region of the object that the suction gripper engages with may, or may not, be well suited to sufficiently react to the suction force in order to be captured by the suction gripper for sorting.

Embodiments of a suction gripper cluster device for material sorting are described herein. In some embodiments, airflows are caused to be generated by a plurality of airflow generators of one or more air conveyor devices and the airflows are provided to a respective plurality of suction gripper mechanisms included in a suction gripper cluster. In some embodiments, the airflows are to enter respective intake ports of the plurality of suction gripper mechanisms and exit respective outlet ports of the plurality of suction gripper mechanisms. A target object (e.g., that is being transported by a conveyor belt) is caused to be captured by the suction gripper cluster using the airflows. In some embodiments, a "suction gripper cluster" is a device that comprises two or more suction gripper mechanisms and the two or more suction gripper mechanisms are configured to emit vacuum/suction airflows that enable the two or more suction gripper mechanisms to collectively capture (e.g., pick up) a target object. A positioning actuator mechanism is activated to position the suction gripper cluster. In some embodiments, after the target object has been captured (e.g., held onto by the suction gripper cluster by the vacuum/suction airflows), the position (e.g., comprising the orientation, location, and/or height) of the suction gripper cluster is adjusted by a positioning actuator mechanism coupled to the suction gripper cluster to facilitate the ejection of the target object or a reversal of airflow from vacuum pressure to forcibly expel the target object. After the suction gripper cluster has been positioned, the target object is caused to be ejected from the suction gripper cluster.

Sorting machinery that utilizes multiple-headed airflow motivated material sorting as described herein has the advantage of being able to engage with the exposed surface of a target object using multiple suction grippers at multiple locations. Such embodiments can quickly and efficiently remove materials from a moving conveyor mechanism in an efficient and effective manner by applying multiple suction streams that interact with different regions of a surface of a target object. The application of multiple suction streams increases the likelihood that the force of suction from at least one of the suction streams will be sufficient to capture the target object (e.g., hold onto the target object), or alternatively, that the composite low pressure region formed by the multiple vacuum streams will be sufficient to capture the target object (e.g., hold onto the target object). Additionally, because each suction gripper mechanism is designed to move independently of the other suction gripper mechanisms within a single suction gripper, the suction gripper mechanisms can flexibly comply against the surface of the target object, which also helps to increase the likelihood that the suction gripper cluster device will successfully capture the target object. In some embodiments, an external control system and object recognition system may be utilized in combination with one or more suction gripper clusters in order to identify target objects, identify the contours of the target objects (e.g., to identify optimal suction gripper cluster placement), control material capture operations, and to activate material ejection operations to deliver captured target items into one or more designated deposit locations.

FIG. 1 is a diagram of an embodiment of a suction gripper cluster device. In some embodiments, a "suction gripper cluster" device is also sometimes referred to as a "multiple-headed airflow motivated gripper" device. In the example shown in FIG. 1, suction gripper cluster 100 comprises a plurality of suction gripper mechanisms 101, where each suction gripper mechanism is mounted within mounting assembly 103. Each of suction gripper mechanisms 101 is coupled to mounting assembly 103 by a corresponding linear bearing component 109. Mounting assembly 103 may be rigidly secured around linear bearing component 109 for each of suction gripper mechanisms 101. In one embodiment, for each of suction gripper mechanisms 101, mounting assembly 103 comprises a through hole through which a corresponding linear bearing component 109 is positioned and securely attached. In some embodiments, mounting assembly 103 and linear bearing component 109 may be rigidly coupled together such as through a weld or mechanical fastener. In some embodiments, mounting assembly 103 and linear bearing component 109 may comprise a single integrated part. Mounting assembly 103 may further comprise one or more mounting points 104 via which mounting assembly 103 may be pivotally coupled to a positioning actuator mechanism, such as an actuator, rotator, arm of a sorting robot, or the like as further described herein.

Each of suction gripper mechanisms 101 further comprises a corresponding linear shaft element 105 secured within its respective linear bearing 109 and having a freedom to travel axially up and down with respect to the axis of a corresponding linear bearing 109. As such, each suction gripper mechanism of suction gripper mechanisms 101 can move axially up and down with respect to the axis of a corresponding linear bearing 109 independently of each other. Each linear shaft 105 comprises internal airflow passage 120 configured to communicate an airflow (having either a positive or negative air pressure) between first port 106 positioned at a first end of each of suction gripper mechanisms 101 and second port 107 positioned at the opposing second end of each of suction gripper mechanisms 101 (and linear shaft 105). Put another way, each linear shaft 105 is a hollow tube through which an airflow can pass through. As illustrated in FIG. 1, attachment 116 can be attached to first port 106, such as, but not limited to a suction cup assembly (for example a flexible cup element which may be a rubber, latex, or other flexible material). Attachments to aid in material grasp (shown at 116) may be coupled to linear shaft 105 by removable coupler 118 that is attached to first port 106. As mentioned above, linear shaft 105 is free to travel axially up and down within a corresponding linear bearing 109. In some embodiments, spring mechanism 108 may be positioned between mounting assembly 103 and stop device 112 located on first port 106 of each of suction gripper mechanisms 101. Spring mechanism 108 exerts a force against stop device 112 to extend linear shaft 105 such that first port 106 is in a fully extended position, absent the presence of any counteracting force, and may compress to permit linear shaft 105 to retract during a capture action to prevent shock or damage to suction gripper cluster 100 due to impact with the target object.

In some embodiments, each of suction gripper mechanisms 101 comprises a corresponding independent air conveyor device 122 that is controllable to generate an airflow through internal airflow passage 120 of respective linear shaft 105. As described in greater detail below, airflows generated through internal airflow passage 120 are utilized to perform target object capture actions, and in some embodiments, ejection actions.

Figure 1A:
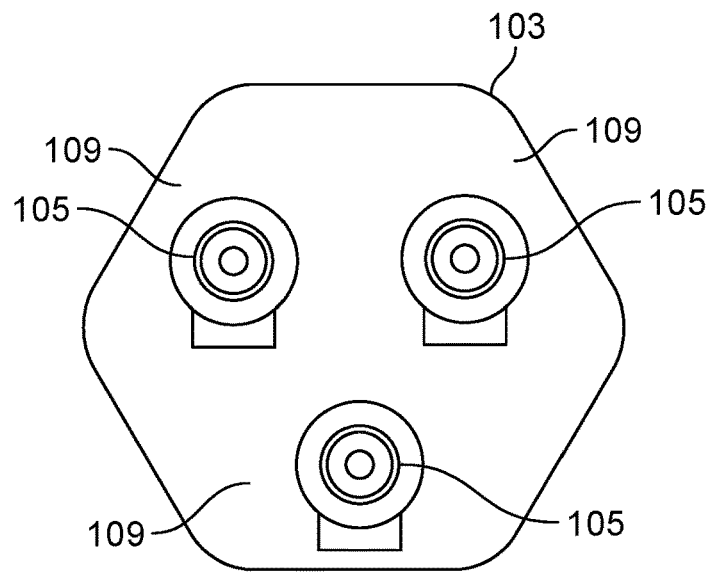
FIGS. 1A and 1B are diagrams illustrating example suction gripper cluster configurations in accordance with some embodiments.

Each air conveyor device 122 can be coupled to respective linear shaft 105 in various ways. In some embodiments, air conveyor device 122 may be an integrated component of linear shaft 105 itself. In another embodiment, air conveyor device 122 may be coupled to either end of linear shaft 105. Air conveyor device 122 may be fastened to linear shaft 105 by a threaded connection, twist lock connection, by a welded connection, or other fastening techniques, for example. In any case, internal airflow passage 120 defines a common air channel through air conveyor device 122 and linear shaft 105 for passing airflows generated by air conveyor device 122. FIG. 1 discloses one configuration where each air conveyor device 122 is positioned proximate to first port 106 at the first (lower) end of linear shaft 105. FIG. 1A discloses a possible alternate configuration where each air conveyor device is positioned proximate to second port 107 at the second (upper) end of linear shaft 105. In still other embodiments, each of air conveyor devices 122 on suction cluster gripper 100 may be arranged on either side of mounting assembly 103 as illustrated by comparison of FIGS. 1B and 1C.

Figure 1B:
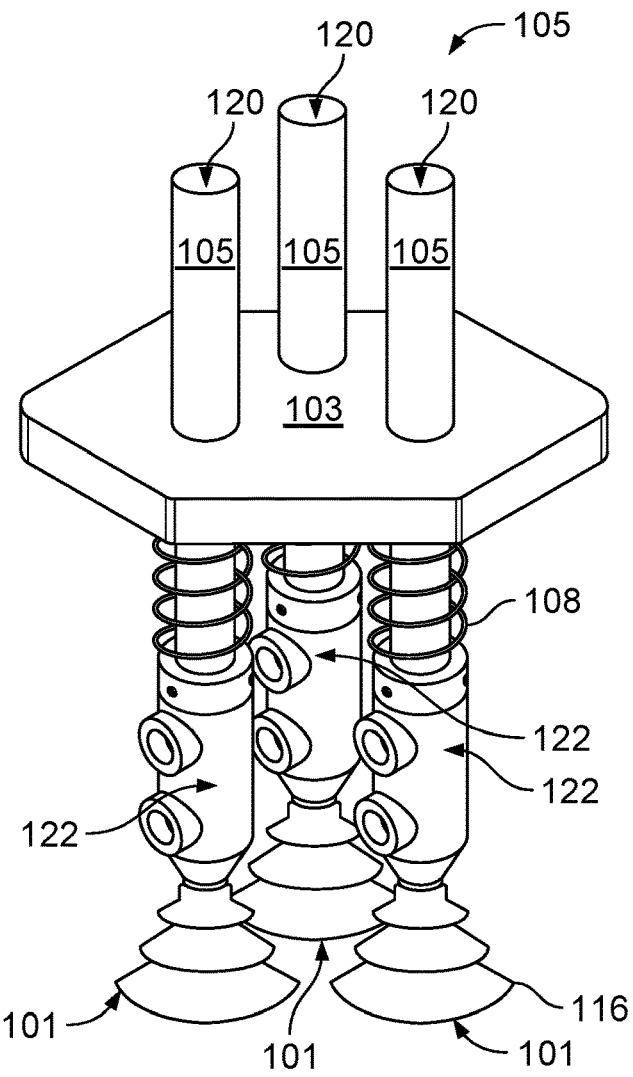
Figure 1C:
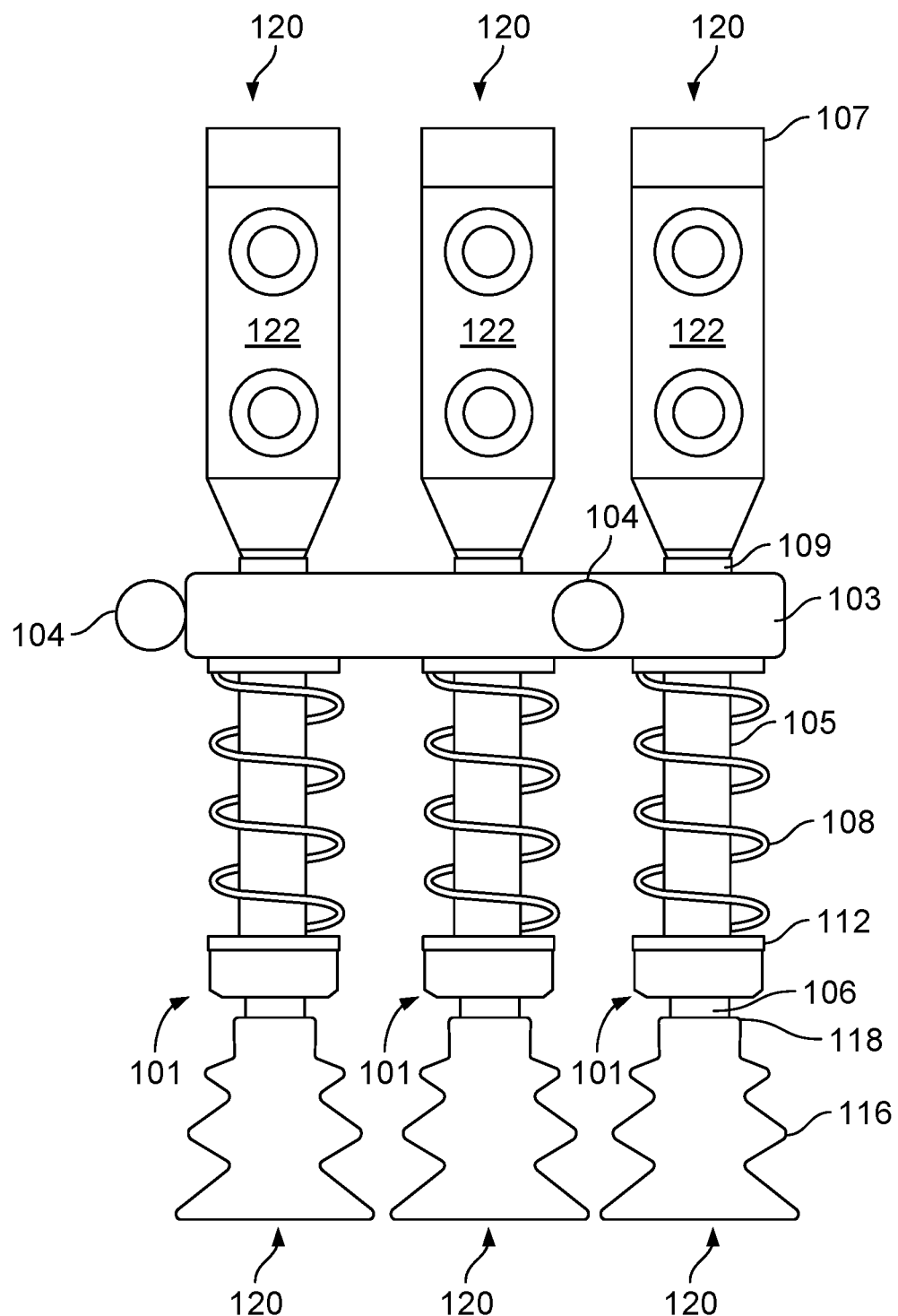
FIG. 1C is a diagram illustrating another example suction gripper cluster configuration in accordance with some embodiments.

It should be understood that suction gripper cluster 100 may comprise any number of two or more suction gripper mechanisms 101 arranged in any arbitrary configuration or alignment with respect to each other. For example, FIGS. 1B and 1C illustrate one optional configuration of suction gripper cluster 100 comprising three suction gripper mechanisms 101 arranged in a triangular configuration within mounting assembly 103

Figure 1D:
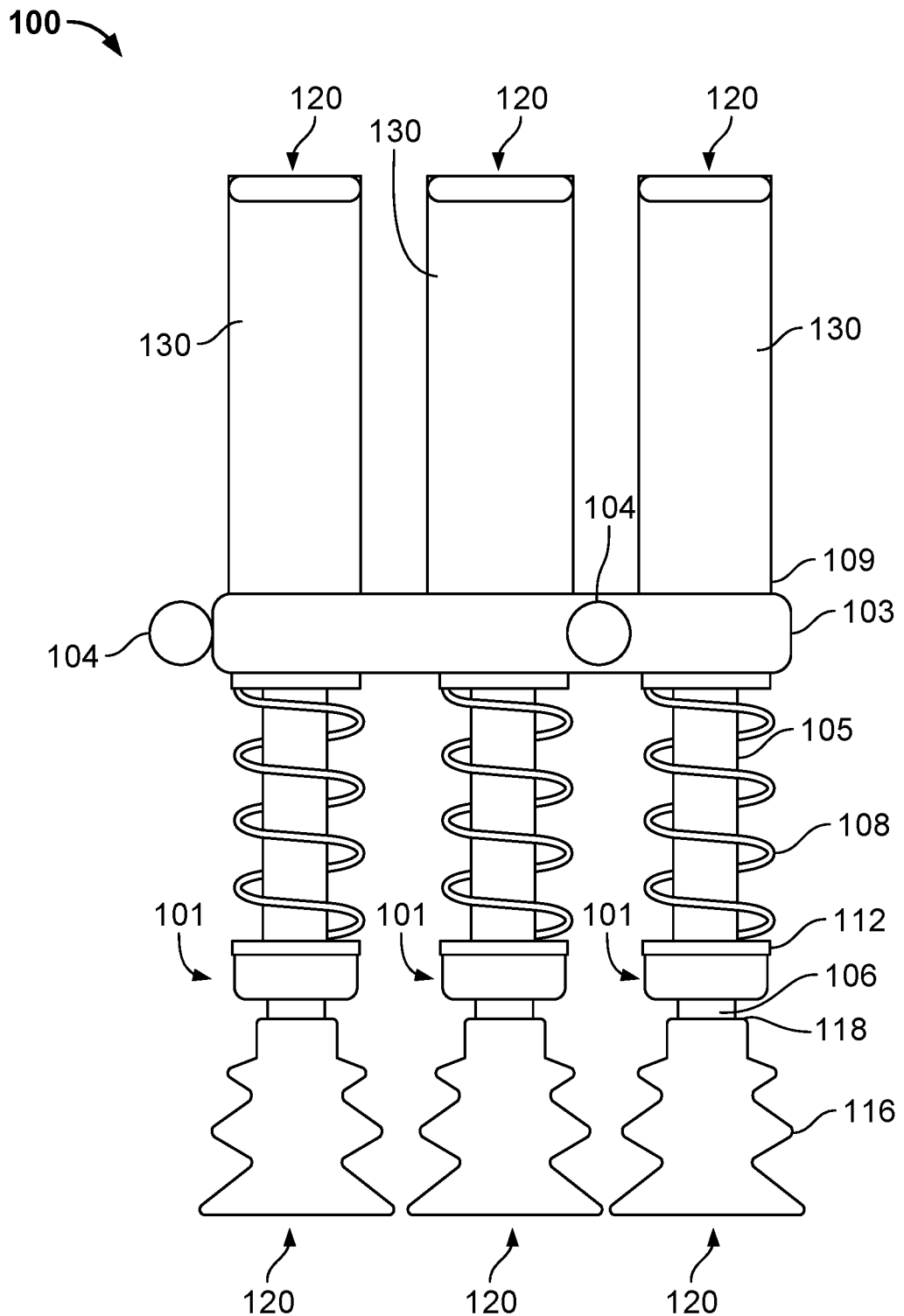
FIG. 1D is a diagram illustrating another example suction gripper cluster configuration in accordance with some embodiments.

FIG. 1D is a diagram illustrating another example suction gripper cluster configuration in accordance with some embodiments. In the example suction gripper cluster configuration shown in FIG. 1D, air conveyor devices still provide airflows (e.g., vacuum air flows or ejection airflows) to suction gripper mechanisms 101 but the air conveyor devices are located remote to suction gripper cluster 100. Unlike the example suction gripper cluster configurations that are shown in FIGS. 1, 1A, 1B, and 1C in which each air conveyor device 122 is integrated with linear shaft 105 of each suction gripper mechanism 101, air conveyor devices 122 of the example suction gripper cluster configuration shown in FIG. 1D are not integrated with linear shafts 105 of suction gripper mechanisms 101. Moreover, in the example suction gripper cluster configuration shown in FIG. 1D, air conveyor devices 122 (not shown in FIG. 1D) are also not directly coupled to mounting assembly 103. Rather, in the example suction gripper cluster configuration shown in FIG. 1D, air conveyor devices 122 are located elsewhere in the pneumatic control system and the pressurized airflows (e.g., vacuum and ejection) that are generated by air conveyor devices 122 are transferred to suction gripper mechanisms 101 via air connections 130. For example, air connections 130 comprises one or more tubes. For example, one tube of air connections 130 connects each suction gripper mechanism 101 to a corresponding remote air conveyor device 122. In another example, one tube of air connections 130 connects one remote air conveyor devices to one or more suction gripper mechanisms 101. As will be shown in an example material sorting system of FIG. 2A, below, remote air conveyor devices 122 that provide airflows to suction gripper mechanisms 101 may be located proximate or in a manner coupled to a pneumatic control system.

Figure 2:
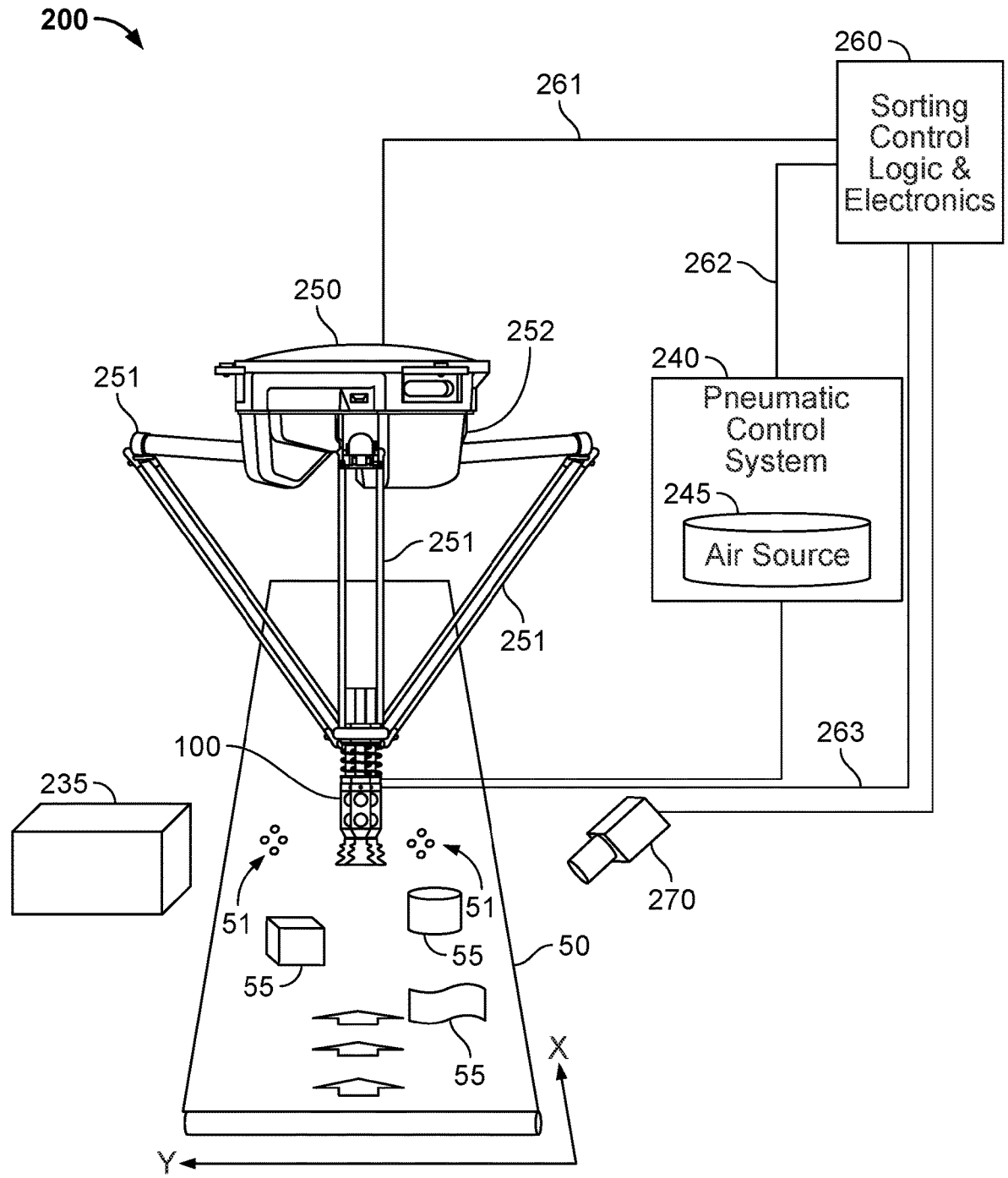
FIGS. 2 and 2A are diagrams illustrating example material sorting systems in accordance with some embodiments.

FIG. 2 is a diagram illustrating an example material sorting system in accordance with some embodiments. In the example of FIG. 2, sorting system 200 includes at least one suction gripper cluster 100 to capture material identified for removal from conveyor mechanism 50. For example, conveyor mechanism 50 is a conveyor belt. Material identified for removal from the conveyor mechanism 50 are referred to herein as "target objects." For example, an object may be identified for removal if it is identified to be of a target material type. Although waste products travelling on a conveyor belt are used as example target objects in the example embodiments described herein, it should be understood that in alternate implementations of these embodiments, the target objects need not be waste materials but may comprise any type of material for which it may be desired to sort and/or segregate. Moreover, although a conveyor belt is used as an example conveyance mechanism for transporting the target objects within reach of suction gripper cluster 100, it should be understood that in alternate implementations of these embodiments, other conveyance mechanisms may be employed. For example, for any of the embodiments described below, in place of an active conveyance mechanism such as a conveyor belt, an alternate conveyance mechanism may comprise a chute, slide, or other passive conveyance mechanisms through and/or from which material tumbles, falls, or otherwise is gravity fed as it passes by the imaging device. In some embodiments, conveyor mechanism 50 may include features (shown at 51) that increase airflow available as intake into suction gripper cluster 100. For example, features 51 such as holes, cleats, treads, or other raised or recessed surface features in, or on, conveyor mechanism 50 may be included in various alternative implementations.

In sorting system 200 shown in FIG. 2, suction gripper cluster 100 is mounted to a positioning actuator mechanism, sorting robot 250. More particularly, suction gripper cluster 100 is pivotally mounted to one or more arms 251 of sorting robot 250. However, it should be understood that the suction gripper clusters disclosed herein are not limited to use only with sorting robot 250 as shown in FIG. 2, but may be used with other controllable positioning apparatuses and mechanisms.

Sorting system 200 supplies airflow to air conveyor devices 122 of suction gripper cluster 100 via pneumatic control system 240. Pneumatic control system 240 may be further pneumatically coupled to, or include, air source 245. In alternate implementations, air source 245 may comprise, for example, a blower, an air compressor, a compressed air storage tank, or some combination thereof or other component that provides pressurized air. Although this disclosure may refer to "air" with regards to "airflow," "air compressor," and other elements, it should be understood that the term "air" is used in a generic sense to refer to any compressible gas or mixture of gasses. It should also be understood that the terms "pressurized air" and "compressed air" are used herein synonymously and generally used to refer to air having a pressure that is greater than atmospheric pressure as would be understood by one of ordinary skilled in the art. Sorting robot 250 and pneumatic control system 240 are coupled to and controlled by sorting control logic and electronics 260. To communicate control signals, sorting control logic and electronics 260 may further comprise elements to generate electrical and/or pneumatic control signals to sorting robot 250 and/or pneumatic control system 240.

In some embodiments, sorting robot 250 comprises robotic actuator 252 that controls the position of robotic arms 251 based on position control signals 261 received from sorting control logic and electronics 260. Sorting robot 250 is instructed by position control signal 261 to control the position (e.g., location, orientation, and/or height) of suction gripper cluster 100. The distal end of robotic arms 251 can each be configured to engage with mounting points 104 of mounting assembly 103 to secure suction gripper cluster 100 to robotic arms 251. In one such embodiment, mounting assembly 103 may be constructed to fit into a Delta-style of robot, as shown in FIG. 2. In other embodiments, other style robots may be utilized. Although sorting robot 250 in FIG. 2 is shown as comprising three robotic arms 251, it should be appreciated that in other implementations, sorting robot 250 may comprise either a greater, or fewer, number of robotic arms 251.

In some embodiments, mounting assembly 103 may be configured in a center-mount configuration, meaning that it positions suction gripper cluster 100 in a center position between the plurality of robotic arms 251. In some embodiments, mounting assembly 103 may comprise a plurality of ball-shaped mounting points 104 positioned around the circumference of mounting element 103, each compatible to mate with complementary socket elements at the distal ends of robotic arms 251 such that each define a ball-and-socket coupling joint securing mounting assembly 103 to robotic arms 251. The ball-and-socket coupling joints allow sufficient freedom for robotic arms 251 to pivot around suction gripper cluster 100 in multiple directions with sufficient clearance to avoid interferences while positioning and operating suction gripper cluster 100 during a capture action. The center-mount configuration also allows a respective linear shaft 105 of each suction gripper mechanism 101 to travel freely to extend up through its respective linear bearing 109 above mounting assembly 103 without interfering with the freedom of motion of robotic arms 251. In one embodiment, each robotic arm 251 is secured to mounting assembly 103 by a set, or pair, of ball and socket coupling points each arranged within a plane oriented normal to linear shaft 105's direction within linear bearing 109.

Material sorting system 200 further comprises at least one object recognition device 270 which is utilized to capture information about objects on conveyor mechanism 50 in order to discern target objects 55 from non-target objects. Object recognition device 270 may comprise an image capturing device (such as, for example, an infrared camera, visual spectrum camera, volumetric sensing or some combination thereof) directed at conveyor mechanism 50. However, it should be understood that an image capturing device for object recognition device 270 is presented as an example implementation. In other embodiments, object recognition device 270 may comprise any other type of sensor that can detect and/or measure characteristics of objects on conveyor mechanism 50. For example, object recognition device 270 may utilize any form of a sensor technology for detecting non-visible electromagnetic radiation (such as a hyperspectral camera, infrared, or ultraviolet), a magnetic sensor, a capacitive sensor, or other sensors commonly used in the field of industrial automation. In some embodiments, object recognition device 270 is directed towards conveyor mechanism 50 in order to capture object information from an overhead view of the materials being transported by conveyor mechanism 50. Object recognition device 270 produces a signal that is delivered to sorting control logic and electronics 260. The signal that is delivered to sorting control logic and electronics 260 from object recognition device 270 may comprise, but is not necessarily, a visual image signal. In the embodiment shown in FIG. 2, object recognition device 270 produces a signal that is delivered to sorting control logic and electronics 260 and which may be used by sorting control logic and electronics 260 to send airflow control signals 262 to pneumatic control system 240 in order to initiate material capture and ejection actions.

Figure 2A:
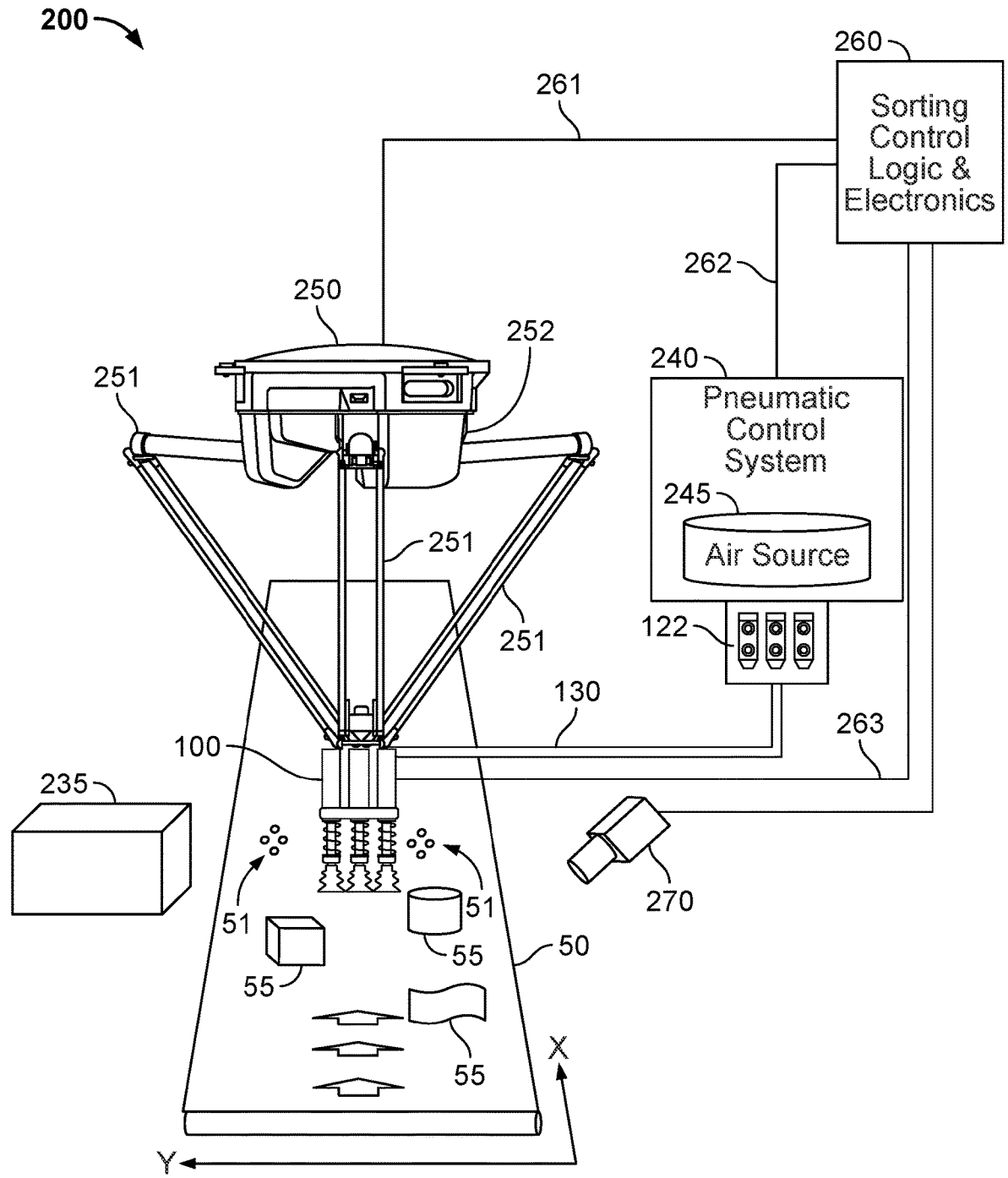

FIG. 2A is a diagram illustrating another example material sorting system in accordance with some embodiments. While the example material sorting system shown in FIG. 2A is very similar to the example material sorting system shown and described with FIG. 2, the example of FIG. 2A differs from the example shown in FIG. 2 in that, in FIG. 2A, air conveyor devices 122 are located remote to suction gripper cluster 100. In the example of FIG. 2A, suction gripper cluster 100 may be implemented using the suction gripper configuration that was described in FIG. 1D, above. In the example of FIG. 2A, air conveyor devices 122 are not integrated with the linear shafts of the suction gripper mechanisms of suction gripper cluster 100 and nor are they coupled to the mounting assembly of suction gripper cluster 100. Instead, air conveyor devices 122 are located proximate to and/or coupled to pneumatic control system 240. In the example of FIG. 2A, air conveyor devices 122 still receive air input from pneumatic control system 240 and use the input air to generate either vacuum or ejection airflows (using corresponding airflow generators) but air conveyor devices 122 deliver the generated vacuum or ejection airflows to the suction gripper mechanisms of suction gripper cluster 100 via air connections 130. For example, each tube of air connections 130 may transfer pressurized airflows from one air conveyor device 122 to one suction gripper mechanism of suction gripper cluster 100. In another example, each tube of air connections 130 may transfer pressurized airflows from one air conveyor device 122 to more than one suction gripper mechanism of suction gripper cluster 100.

Figure 2B:
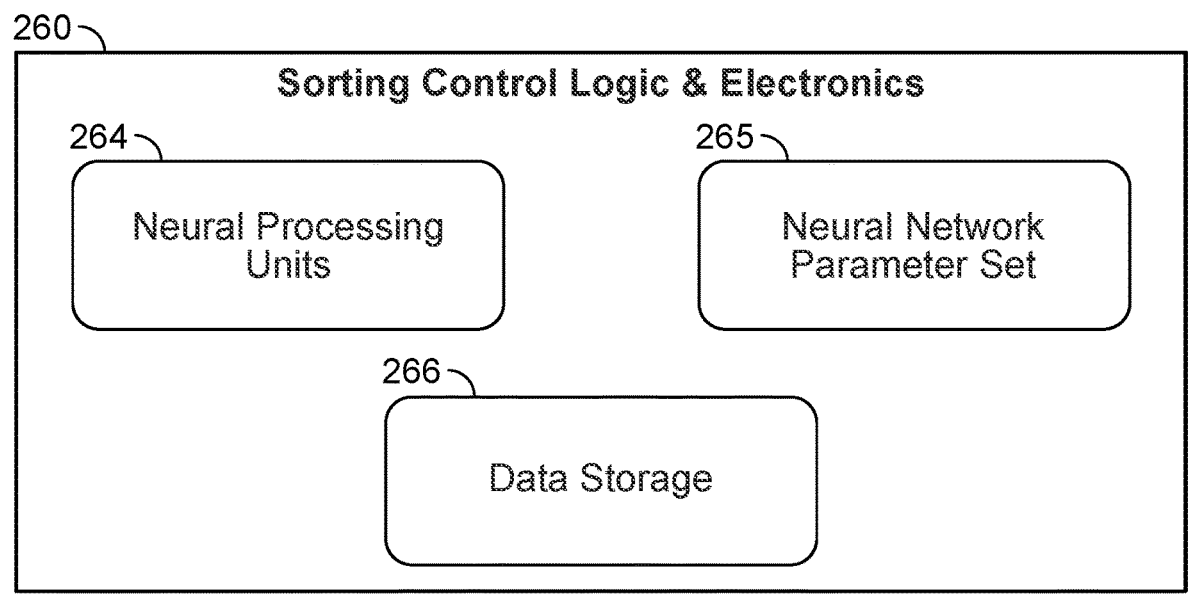
FIG. 2B is a diagram illustrating an example sorting control logic and electronics.

In one example shown in FIG. 2B, sorting control logic and electronics 260 comprises one or more neural processing units 264, neural network parameter set 265 (which stores learned parameters utilized by neural processing units 264), and data storage 266 that stores, for example, object data received from object recognition device 270, processed object data comprising labeled data, and/or may further be used to store other data such as material characterization data generated by neural processing units 264. Sorting control logic and electronics 260 may determine from generated material characterization data that target object 55 has a certain characteristic (for example, size, shape, orientation, material type or composition, or any other characteristic or distinguishing properties discernible by sorting control logic and electronics 260).

Neural network parameter set 265 and data storage 266 may either be implemented together on a common physical non-transient memory device, or on separate physical non-transient memory devices. In some embodiments, data storage 266 may comprise a removable storage media. In various embodiments, sorting control logic and electronics 260 may be implemented using a microprocessor coupled to a memory that is programmed to execute code to carry out the functions of sorting control logic and electronics 260 described herein. In other embodiments, sorting control logic and electronics 260 may additionally, or alternately, be implemented using an application specific integrated circuit (ASIC) or field programmable gate array (FPGA) that has been adapted for machine learning.

In some embodiments, within sorting control logic and electronics 260, raw object data (which in the case of camera sensor may comprise image frames, for example) is provided as input to one or more neural network and artificial intelligence algorithms of neural processing units 264 to locate and identify material appearing within the image frames that are potentially target object 55. As the term is used herein, an "image frame" is intended to refer to a collection or collected set of object data captured by object recognition device 270 that may be used to capture the spatial context of one or more potential target objects on conveyor mechanism 50 along with characteristics about the object itself. A feed of image frames captured by object recognition device 270 is fed, for example, to a machine learning inference algorithm implemented by neural processing units 264. The sequence of captured image frames may be processed by multiple processing layers, or neurons, of neural processing units 264 to evaluate the correlation of specific features with features of objects that it has previously learned. Alternative algorithms to detect objects within an image include Fully Convolutional Neural Network, Multibox, Region-based Fully Convolutional Networks (R-FCN), Faster R-CNN, and other techniques commonly known to those skilled in the art as object detection, instance-aware segmentation, or semantic segmentation algorithms described in available literature.

Based on the input raw object data (e.g., image frames) that is provided by object recognition device 270, sorting control logic and electronics 260 is configured to determine information related to target objects that are being transported by conveyor mechanism 50. In some embodiments, the information related to target objects that are determined by sorting control logic and electronics 260 includes attribute information. For example, attribute information includes one or more of, but not limited to, the following: a material type associated with each target object, an approximate mass associated with each target object, an associated geometry associated with each target object, dimensions (e.g., height and width/area) associated with each target object, a designated deposit location associated with each target object, and an orientation associated with each target object. In some embodiments, attribute information associated with a target object that can be determined by sorting control logic and electronics 260 further includes the contours of the target object. For example, the contours of the target object may include the shape and/or texture of one or more surfaces of the target object. For example, the contours of the target object may be used to determine an (e.g., optimal) placement of suction gripper cluster 100 on the target object by selecting the surface of the target object on which to place suction gripper cluster 100 which has contours that match closest to a set of predetermined contour features. In a specific example, the set of predetermined contour features describe a flat surface, which would be an optimal surface to place suction gripper cluster 100. In some embodiments, the information related to target objects that are determined by sorting control logic and electronics 260 includes location information. For example, location information includes one or more coordinates (e.g., along the X and Y axes as shown in FIG. 2) at which each target object was located in the image frame(s) that were input into sorting control logic and electronics 260. In a specific example, the location information of each target object is the coordinate of the centroid of the target object.

Using the attribute information and/or location information associated with each target object, sorting control logic and electronics 260 is configured to select a target object, from conveyor mechanism 50, on which to perform a capture action. In various embodiments, performing a "capture action" on a target object comprises using suction gripper cluster 100 to emit a vacuum force/airflow from each of suction gripper mechanisms 101 that will pull a target object towards suction gripper cluster 100 and off of conveyor mechanism 50. In some embodiments, which target object is selected for suction gripper cluster 100 to capture next is determined as a function of one or more, but not limited to the following: the current location of suction gripper cluster 100, the current location of the target object, the deposit location corresponding to the target object, the speed of conveyor mechanism 50, and/or an approximated (e.g., resale) value of the target object. In some embodiments, sorting control logic and electronics 260 is configured to select a target object to capture based on the attribute information associated with the target object and/or the location information associated with the target object. In a first example, a target object is selected to be captured because its current location on conveyor mechanism 50 is close to the current location of suction gripper cluster 100, which means suction gripper cluster 100 can reach the target object without being repositioned. In a second example, a target object is selected because, based on its material type, dimensions (e.g., area), and/or mass, the target object is determined to be of a higher (e.g., resale) value. In a third example, a target object is selected because its current location is close to the location of its corresponding deposit location (e.g., the corresponding deposit location is determined based on the material type associated with the target object).

In some embodiments, given the target object that had been selected by sorting control logic and electronics 260 to capture, sorting control logic and electronics 260 is configured to select at least a subset of suction gripper mechanisms 101 of suction gripper cluster 100 to use to emit a vacuum force during a capture action on the selected target object. In some embodiments, sorting control logic and electronics 260 is configured to select one or more of suction gripper mechanisms 101 to emit a vacuum force during a capture action on a target object based on the attribute information associated with the target object and/or the location information associated with the target object. In a first example, one or more suction gripper mechanisms 101 of suction gripper cluster 100 are selected to perform a capture action on a target object because the collective width of those suction gripper mechanisms is large enough to accommodate the dimensions (e.g., size, width, length, area) of the target object. In a second example, more than one or more suction gripper mechanisms 101 of suction gripper cluster 100 are selected to perform a capture action on a target object because the large dimensions (e.g., size, width, length, area) of the target object cannot be accommodated by the vacuum force of a single suction gripper mechanism. In a third example, one or more suction gripper mechanisms 101 of suction gripper cluster 100 are selected to perform a capture action on a target object because the current position(s) of those suction gripper mechanisms within suction gripper cluster 100 are close to (e.g., within a predetermined distance of) the current position of the target object. In a specific example, the Y-coordinate of the centroid of Target Object A is determined by sorting control logic and electronics 260 to be at Y1 of the Y-axis as shown in FIG. 2 as Target Object A is transported along the X-axis as shown in FIG. 2. The one or more of suction gripper mechanism 101 that are selected to perform a capture action on Target Object A may be those that are currently positioned at a Y-coordinate along the Y-axis that is closest to Y1, which is the Y-coordinate of Target Object A.

After the target object to capture has been selected, sorting control logic and electronics 260 is configured to send a position control signal to sorting robot 250 that is to actuate suction gripper cluster 100 to enable suction gripper cluster 100 to perform a "capture action" or a "pick" on the selected target object (e.g., target object 55). Sorting control logic and electronics 260 may be programmed to operate both robotic arms 251 and pneumatic control system 240 to perform the capture action on target object 55. In some embodiments, in operation, a capture action comprises positioning suction gripper cluster 100 over target object 55 (e.g., by moving suction gripper cluster 100 across one or more both X and Y axes as shown in FIG. 2) based on the position control signal, activating pneumatic control system 240, and controlling sorting robot 250 to lower suction gripper cluster 100 towards target object 55. In some embodiments, one or more of suction gripper mechanisms 101 of suction gripper cluster 100 make contact with target object 55 while it is still on conveyor mechanism 50, while applying a vacuum force to capture target object 55. In embodiments, suction gripper mechanisms 101 of the suction gripper cluster 100 may exert enough vacuum/suction force to lift target object 55 from conveyor mechanism 50 before contact is made to capture target object 55. In some embodiments, while sorting robot 250 lowers the entire suction gripper cluster 100 towards target object 55, sorting control logic and electronics 260 causes only the selected subset of suction gripper mechanisms 101 of suction gripper cluster 100 to emit a vacuum/suction force. The subset of suction gripper mechanisms 101 can be selected as described above. In some embodiments, while sorting robot 250 lowers the entire suction gripper cluster 100 towards target object 55, sorting control logic and electronics 260 causes all suction gripper mechanisms 101 of suction gripper cluster 100 to emit a vacuum/suction force. Including multiple suction gripper mechanisms 101 within suction gripper cluster 100 increases the points of contact and sources of suction force between suction gripper cluster 100 and target object 55, thereby increasing the likelihood that target object 55 will be successfully captured. In various embodiments, target object 55 is successfully captured if it is lifted/picked up from conveyor mechanism 50 and adhered/held by suction gripper cluster 100.

After or concurrent with sorting control logic and electronics 260 sending the position control signal, sorting control logic and electronics 260 is configured to send an airflow control signal to pneumatic control system 240. In response to the airflow control signal, pneumatic control system 240 is configured to cause suction gripper cluster 100 to perform the capture action on the corresponding target object. The airflow control signal is configured to instruct pneumatic control system 140 to supply an airflow to a respective air input port of (e.g., selected) suction gripper mechanisms 101 of suction gripper cluster 100, as will be described in further detail below, where a corresponding airflow generator within each suction gripper mechanism is configured to direct the airflow into a vacuum airflow/force that flows from the intake port to the outlet port of that suction gripper mechanism. The vacuum airflow that flows through each instance of the suction gripper mechanism will therefore enable a capture action to be collectively performed by suction gripper cluster 100 by drawing the target object off of conveyor mechanism 50 and towards suction gripper cluster 100. In some embodiments, the airflow control signal sent by sorting control logic and electronics 260 is a variable control signal that includes a parameter that dictates the pressure of the airflow to be supplied by pneumatic control system 240. The variable control signal will determine the pressure of pneumatic airflow and therefore, the amount of vacuum force that will be applied to the target object. In some embodiments, sorting control logic and electronics 260 is configured to instruct a static/fixed pressure for a pneumatic airflow (and therefore, static vacuum force) for each capture action. In some embodiments, sorting control logic and electronics 260 is configured to dynamically determine a pressure for a pneumatic airflow for each capture action. For example, the pressure of pneumatic airflow can be dynamically determined based at least in part on the weight or mass of the target object, the size of the target object, the material type of the target object, and the speed of conveyor mechanism 50. If a capture action is successful, a target object is picked up off conveyor mechanism 50 by suction gripper cluster 100. In some embodiments, a successful capture action can be determined by detecting a change (e.g., matching a predetermined signature) in pressure within at least some suction gripper mechanisms 101 of suction gripper cluster 100 (e.g., as detected by a material obstruction sensor associated with at least some of suction gripper mechanisms 101 of suction gripper cluster 100), the motor associated with sorting robot 250, and/or in a current that is drawn by sorting robot 250.

In some embodiments, although sorting control logic and electronics 260 may have some sense of how tall target object 55 is (e.g., the height of target object 55 relative to the surface of conveyor mechanism 50) (for example, by processing data such as an image captured by object recognition device 270 or data from another sensor) before it attempts a pick (e.g., via sending an airflow control signal to pneumatic control system 240), sorting robot 250 is not certain of exactly how tall target object 55 is. For this reason, suction gripper mechanisms 101 can be configured as shown in FIG. 1, for reasons as follows: When at least some of suction gripper mechanisms 101 makes contact with target object 55, the force of contact will cause the bottom end of linear shaft 105 to slide up into linear bearing 109 (which will correspondingly cause the opposing top end of linear shaft 105 to slide out from linear bearing 109) and cause spring mechanism 108 to compress. As such, due to the suspension provided by spring mechanism 108, suction gripper mechanisms 101 can be pushed upwards relative to the surface of conveyor mechanism 50 and therefore provide compliance with respect to the contacted target object 55. Furthermore, each of suction gripper mechanisms 101 can move independently of each other due to its respective linear shaft 105 and linear bearing 109 within mounting assembly 103. In this way, target objects of various dimensions can be accommodated without causing damage to components of sorting robot 250 or suction gripper mechanisms 101 from the force of impact. When the capture action is complete and the airflow deactivated by sorting control logic and electronics 260, spring mechanism 108 will extend linear shaft 105 back to its fully extended position. In some embodiments, detection of contact with target object 55 may be detected, for example, through a sensor providing feedback to sorting control logic and electronics 260, and based on that detection, further motion of suction gripper mechanisms 101 in the z-direction (e.g., further downwards towards object 55) may be inhibited by sorting control logic and electronics 260 to protect against potential damage to suction gripper mechanisms 101. In some embodiments, at the completion of each capture action, sorting control logic and electronics 260 controls pneumatic control system 240 to optionally reverse the airflow through suction gripper cluster 100 so that a positive air is flowing out from first port 106. Airflow reversal may serve not only to release and/or propel target object 55 from the grasp of suction gripper mechanisms 101, but also purge dust from pneumatic control system 240 as well as expel other undesirable materials (such as plastic bags or wraps) that were drawn into internal airflow passage 120 of suction gripper mechanisms 101.

Figure 3:
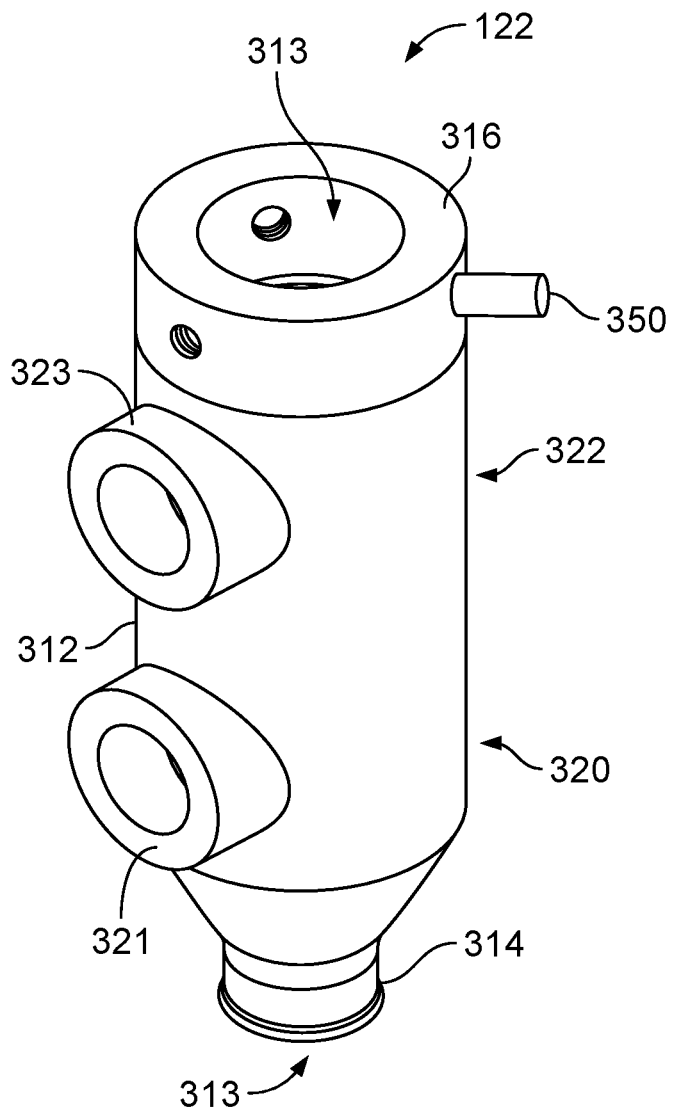
FIG. 3 is a diagram illustrating an example of an air conveyor device that may be used to provide airflows to a suction gripper mechanism in accordance with some embodiments.

FIG. 3 is a diagram illustrating an example of an air conveyor device that may be used to provide airflows to a suction gripper mechanism in accordance with some embodiments. In some embodiments, each of suction gripper mechanisms 101 included in suction gripper cluster 100 of FIG. 1 may be provided pressurized airflows from an instance of air conveyor device 122 as described in FIG. 2. As shown in FIG. 3, air conveyor device 122 comprises a body or housing 312 that includes internal through-passage 313. As mentioned above, in some embodiments, internal through-passage 313 of air conveyor device 122 may define a portion of internal airflow passage 120 through a suction gripper mechanism of suction gripper mechanisms 101. That is, internal through-passage 313 may directly lead to and be in communication with internal airflow passage 120 of linear shaft 105. Air conveyor device 122 may selectively generate a negative pressure airflow pulled into internal through-passage 313 from intake port 314 of housing 312 to outlet port 316 of housing 312 (e.g., during a capture action), or a positive pressure airflow through passage 313 that is pulled in from outlet port 316 and out from intake port 314 (e.g., during an ejection action).

Air conveyor gripper device 122 comprises at least a pair of airflow generators (shown at 320 and 322 and in greater detail in FIGS. 4 and 4A-5D). First airflow generator 320, which may be referred to herein as object capture airflow generator 320, generates the negative pressure airflow intake (i.e., a suction air flow) at intake port 314 of air conveyor device 122. This airflow intake results in a force of airflow (i.e., a vacuum or negative pressure force) into first port 106 of each one of suction gripper mechanisms 101 that extracts target object 55 from conveyor mechanism 50 and holds it at first port 106. Second airflow generator 322, which may be referred to herein as object ejection airflow generator 322, generates positive pressure airflow (at this, an outflow) at first port 106 of each one of suction gripper mechanisms 101. This positive pressure airflow flows through internal airflow passage 120 and out from intake first port 106 to eject captured objects from each one of suction gripper mechanisms 101.

In some embodiments, each of first and second airflow generators 320, 322 may incorporate the structure of a Venturi and/or Coanda-based technology, or similar technology, to generate their respective airflows. That is, the motive forces that create the airflows through suction gripper cluster 100 are the result of a flow of compressed air streams supplied by air source 245 of pneumatic control system 240. As further discussed in detail below, coupling pressurized air input port 321 of first airflow generator 320 to pressurized air source 245 will activate first airflow generator 320 to generate the airflow into first port 106 of a corresponding one of suction gripper mechanisms 101. Coupling pressurized air input port 323 of second airflow generator 322 to pressurized air source 245 will activate second airflow generator 322 to generate the airflow out of first port 106 of a corresponding one of suction gripper mechanisms 101.

Figure 4:
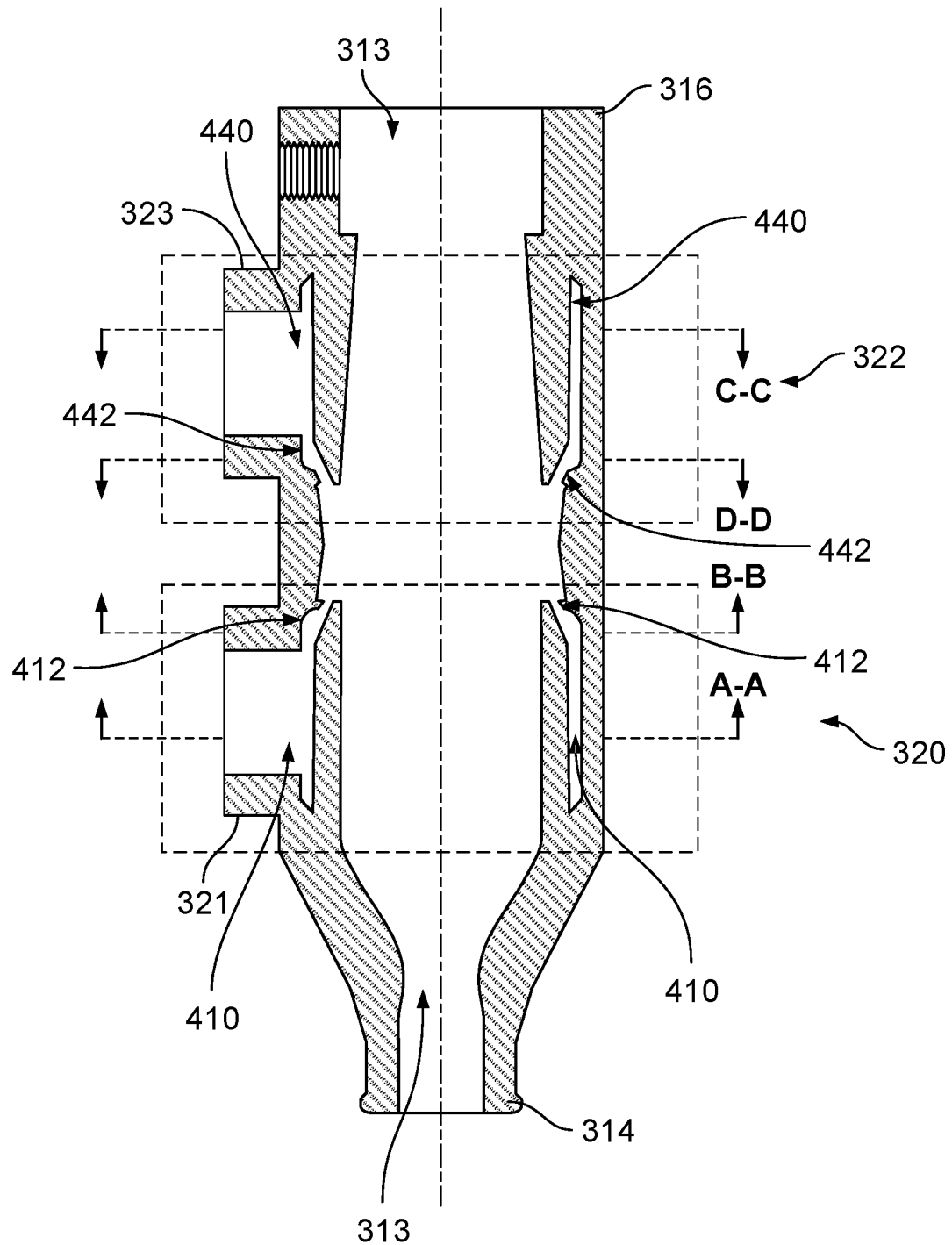

FIGS. 4 and 4A-4D are figures depicting cut-away views of an example air conveyor device in accordance with some embodiments. FIG. 4 provides a cut-away side view illustrating the internal structure of two airflow generators 320, 322. FIGS. 4A and 4B provide cross-sectional top views of object capture airflow generator 320 for cross-sections A-A and B-B. FIGS. 4C and 4D provide cross-sectional top views of object ejection airflow generator 322 for cross-sections C-C and D-D. In some embodiments, air conveyor device 122 of FIGS. 1, 1B, 1C, and 3 may be implemented using the examples described in FIGS. 4 and 4A-4D. In some embodiments, each of suction gripper mechanisms 101 included in suction gripper cluster 100 of FIG. 1 may be implemented with an instance of air conveyor device 122 as described in FIGS. 4 and 4A-4D. In some embodiments, each of suction gripper mechanisms 101 included in suction gripper cluster 100 of FIG. 1D may be provided airflows from an instance of air conveyor device 122 as described in FIGS. 4 and 4A-4D.

With respect to object capture airflow generator 320, pressurized air input port 321 is communicatively coupled to first high-pressure air distribution ring 410 that is disposed within housing 312. Air distribution ring 410 at least partially encircles internal through-passage 313. A plurality of air ejector nozzles (shown at 412) is coupled to the first air distribution ring 410 and positioned around the ring. Air ejector nozzles 412 are positioned to direct compressed air entering the first air distribution ring 410 (from pressurized air input port 321) into internal through-passage 313 in a direction away from intake port 314 and towards outlet port 316. In some embodiments, a tapered shape of air ejector nozzles 412 may be utilized to further compress the air ejected into internal through-passage 313. The air enters internal through-passage 313 at high speeds and rapidly expands upon entry to create a relative low pressure region within housing 312 of air conveyor device 122 that draws an airflow in from intake port 314 and out from outlet port 316. The orientation of air ejector nozzles 412, which directs the expanding compressed air away from intake port 314 and towards outlet port 316, establishes the directionality of the airflow through air conveyor device 122 to be in from intake port 314 and out from outlet port 316 so that materials (e.g., target objects 55) may be captured by suction gripper mechanisms 101. The force of the airflow generated by object capture airflow generator 320 may be controlled as a function of the pressure and/or volume of air delivered to pressured air input port 321 and/or the design (e.g., the taper) of air ejector nozzles 412, at least.

With respect to object ejector airflow generator 322, pressurized air input port 323 is communicatively coupled to the second high-pressure air distribution ring 440 disposed within housing 312. Air distribution ring 440 at least partially encircles internal through-passage 313. A plurality of air ejector nozzles (shown at 442) is coupled to the second air distribution ring 440 and positioned around the ring. Air ejector nozzles 442 are positioned to direct compressed air entering the second air distribution ring 440 (from pressurized air input port 323) into internal through-passage 313 in a direction towards intake port 314 and away from outlet port 316. In some embodiments, a tapered shape of air ejector nozzles 442 may be utilized to further compress the air ejected into internal through-passage 313. The air therefore enters internal through-passage 313 at high speeds and rapidly expands upon entry to create a relative low pressure region within housing 312 of air conveyor device 122 that draws an airflow in from outlet port 316 and out from intake port 314. The orientation of air ejector nozzles 442 that directs the expanding compressed air away from outlet port 316 and towards intake port 314 at a high velocity establishes the directionality of the airflow through air conveyor device 122 to be in from outlet port 316 and out from intake port 314 so that obstructions may be ejected from air conveyor device 122. The force of the airflow generated by object ejector airflow generator 322 may be controlled as a function of the pressure and/or volume of air delivered to pressurized air input port 323 and/or the design (e.g., the taper) of air ejector nozzles 442, at least.

Figure 5:
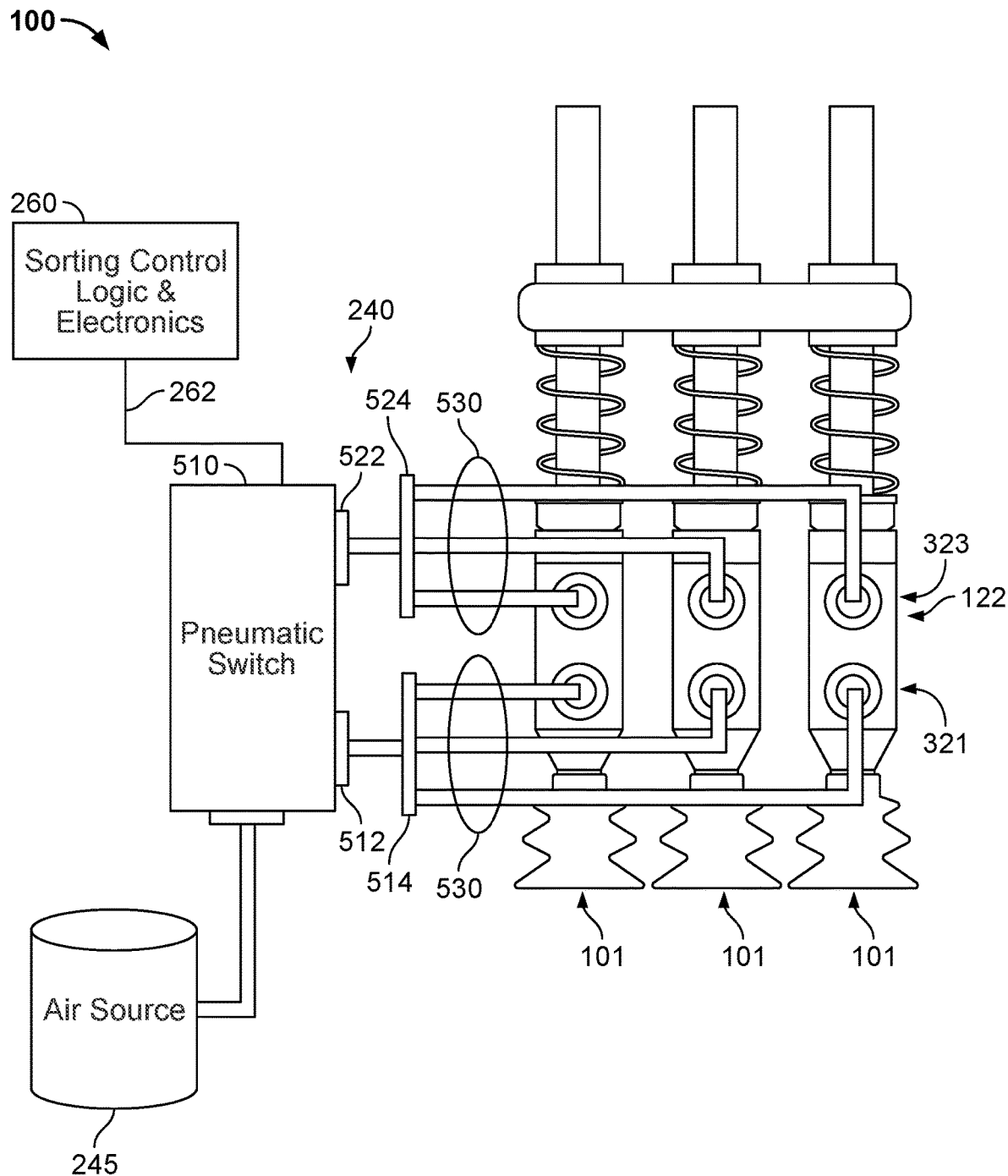
FIG. 5 illustrates example interconnections between an example pneumatic control system and with first and second airflow generators of suction gripper mechanisms of a suction gripper cluster.

FIG. 5 illustrates example interconnections between an example pneumatic control system and with first and second airflow generators of suction gripper mechanisms of a suction gripper cluster. In some embodiments, the interconnections between pneumatic control system 240 of FIG. 2 and first and second airflow generators 320 and 322 of FIG. 3 may be implemented using the example interconnections that are described in FIG. 5. Pneumatic control system 240 provides an air supply for selectively operating and controlling both airflow generators 320 and 322 for each suction gripper mechanism of suction gripper mechanisms 101 of suction gripper cluster 100 of FIGS. 1, 1A, 1B, and 1C. In some embodiments, such as shown in FIG. 5, pneumatic control system 240 comprises pneumatic switch 510 coupled to air source 245. Pneumatic control system 240 is also coupled to sorting control logic and electronics 260 from which it receives airflow control signal 262.

In response to airflow control signal 262, pneumatic control system 240 may selectively direct pressurized air to either first airflow generator 320 or second airflow generator 322 of each air conveyor device 122 associated with suction gripper mechanisms 101. In FIG. 5, first compressed air output port 512 of pneumatic switch 510 is coupled to first manifold 514 that is coupled to pressurized air input port 321 of object capture airflow generator 320 of each air conveyor device 122 associated with suction gripper mechanisms 101 of suction gripper cluster 100. Similarly, second compressed air output port 522 of pneumatic switch 510 is coupled to second manifold 524 that is coupled to pressurized air input port 323 of object ejection airflow generator 322 of air conveyor device 122 associated with suction gripper mechanisms 101 of suction gripper cluster 100. Pressurized air input ports 321 and 323 may be coupled to their respective manifolds 514 and 524 using flexible tubing (shown at 530), rotatable couplings, and/or other components that accommodate the dynamic movements of suction gripper cluster 100 during capture and ejection actions. It should be understood that the functions and operations attributed to pneumatic switch 510 in this disclosure may be implemented in any number of ways. For example, pneumatic switch 510 may be implemented using a combination of manifolds, controllable valves, and/or sets of pneumatic switches or other technology for selectively controlling the distribution of compressed air.

When pneumatic switch 510 receives airflow control signal 262 from sorting control logic and electronics 260 to perform a capture action, pneumatic switch 510 controls an output of first output port 512 to supply pressurized air to pressurized air input port 321 of object capture airflow generator 320 of each air conveyor device 122 associated with suction gripper mechanisms 101 of suction gripper cluster 100. In some embodiments, sorting control logic and electronics 260 may output a binary on/off control signal so that pneumatic switch 510 either turns the pressurized air to pressurized air input port 321 of object capture airflow generator 320 of each air conveyor device 122 associated with suction gripper mechanisms 101 of suction gripper cluster 100 on or off. In other embodiments, sorting control logic and electronics 260 may output a (e.g., dynamically determined) variable control signal to pneumatic switch 510 that indicates an amount of pneumatic airflow to be applied to pressured air input port 321 of object capture airflow generator 320 of each air conveyor device 122 associated with suction gripper mechanisms 101 of suction gripper cluster 100. The dynamically determined variable level of force may be based, for example, on the weight or mass of target object 55, the size of target object 55, the material type of target object 55, and the speed of conveyor mechanism 50. In this way, sorting control logic and electronics 260 can variably control the vacuum force applied by suction gripper mechanisms 101 of suction gripper cluster 100 to target object 55 during a capture action.

Although this disclosure may refer generally to a receptacle as an example for material deposit location 235, it should be understood that material deposit location 235 may comprise any form of a holding bin, tank, bunker, or other receptacle, conveyor mechanism, or chute where extracted objects can be deposited. The particular destination for items removed from the conveyor mechanism may depend upon whether they are contaminants or desired materials. In some embodiments, receptacle 235 may comprise a cargo area of a truck or other vehicle so that removed objects are directly loaded onto the vehicle for transport. In other embodiments, receptacle 235 may comprise another conveyor mechanism to transport the removed objects to another location in the facility.

The timing of position control signal 261 and airflow control signal 262 sent by sorting control logic and electronics 260 may be timed so that the activation of object capture airflow generators 320 on suction gripper cluster 100 occurs at a point in time where target object 55 becomes within reach of suction gripper cluster 100. For example, object capture airflow generators 320 can be activated at the point where target object 55 is close enough that the vacuum force of suction gripper cluster 100's object capture airflow generators 320 is effectively strong enough to capture target object 55.

Once target object 55 is captured by at least one of suction gripper mechanisms 101 of suction gripper cluster 100, object capture airflow generators 320 may be deactivated and suction gripper cluster 100 operated to eject or discharge target object 55 to a material deposit location (shown at 235 in FIG. 2). When pneumatic switch 510 receives airflow control signal 262 from sorting control logic and electronics 260 to perform an ejection action, pneumatic switch 510 controls an output of second output port 522 to supply pressurized air to pressurized air input port 323 of object ejection airflow generator 322 of each air conveyor device 122 associated with suction gripper mechanisms 101 of suction gripper cluster 100. In some embodiments, sorting control logic and electronics 260 may output a binary on/off control signal so that pneumatic switch 510 either turns the compressed air to pressurized air input port 323 or object ejection airflow generator 322 on or off. In other embodiments, sorting control logic and electronics 260 may output a (e.g., dynamically determined) variable control signal to pneumatic switch 510, where the variable control signal indicates an amount of pneumatic airflow to be supplied to pressurized air input port 323 of object ejection airflow generator 322 of each air conveyor device 122 associated with suction gripper mechanisms 101 of suction gripper cluster 100. The dynamically determined variable level of force may be based, for example, on the weight or mass of target object 55, the size of target object 55, the material type of target object 55, and the distance from the current position of suction gripper cluster 100 to designated material deposit location 235. In this way, sorting control logic and electronics 260 can variably control the positive pressure (e.g., ejection) force applied by suction gripper mechanisms 101 of suction gripper cluster 100 to target object 55 during an ejection action to eject a captured target object into a deposit location or an obstruction out of suction gripper mechanisms 101 of suction gripper cluster 100.

In some embodiments, while pneumatic switch 510 provides pressurized air to both air input ports 321 and 323 of air conveyor device 122 associated with suction gripper mechanisms 101, pneumatic switch 510 does not control the direction or type of pressure (e.g., positive or negative) of the airflow that flows through suction gripper mechanisms 101. Rather, a respective set of physical features (which are sometimes referred as an "airflow generator") corresponding to each of air input ports 321 and 323 within the interior of each of suction gripper mechanisms 101 (e.g., where each comprises air conveyor device 122) is configured to generate either a negative or positive pressure based on the supplied pressurized air. Specifically, object capture airflow generator 320 corresponding to air input port 321 is configured to generate a negative pressure airflow (e.g., to allow air conveyor device 122 to perform a capture action) when pneumatic switch 510 is controlled to supply pressurized air into air input port 321. Furthermore, object ejection airflow generator 322 corresponding to air input port 323 is configured to generate a positive pressure airflow (e.g., to eject content out of or away from air conveyor device 122) when pneumatic switch 510 is controlled to supply pressurized air into air input port 323, as described herein.

While FIG. 5 shows a single pneumatic switch, pneumatic switch 510, that is configured to supply pressurized air to both air input ports 321 and 323 of each of suction gripper mechanisms 101 (e.g., each comprising air conveyor device 122), in some embodiments, a separate pneumatic switch can supply pressurized air to each of air input ports 321 and 323 of each of suction gripper mechanisms 101 (e.g., each comprising air conveyor device 122).

In some embodiments, each suction gripper mechanism 101 (e.g., comprising air conveyor gripper device 122) of suction gripper cluster 100 or suction gripper cluster 100 as a whole may include a respective material obstruction sensor 350 (for example, at outlet port 316) that sends feedback signal 263 to sorting control logic and electronics 260 to indicate when a captured object has become an obstruction. Material obstruction sensor 350 is not limited to any particular technology, and may comprise, for example, a pressure sensor, airflow sensor, ultrasonic sensor, infrared sensor, image sensor, opacity sensor, or the like. In some embodiments, when material obstruction sensor 350 detects an obstruction, sorting control logic and electronics 260 may respond with a control signal to operate pneumatic switch 510 to deactivate object capture airflow generator 320, and instead activate object ejection airflow generator 322 to clear the obstruction from suction gripper mechanisms 101. In some embodiments, material obstruction sensor 350 is used to detect whether a capture action on target object 55 has been successful. For example, material obstruction sensor 350 can detect that a capture action on target object 55 has been successful where material obstruction sensor 350 determines that after a negative pressure (e.g., vacuum) force is applied on target object 55, the pressure that is detected by material obstruction sensor 350 drops by at least a predetermined amount. In some embodiments, when feedback signal 263 indicates a successful capture action where target object 55 has been captured at (e.g., is adhering to) intake port 314 or attachment 116 of air conveyor device 122 that form each of at least some of suction gripper mechanisms 101, sorting control logic and electronics 260 may respond with an airflow control signal to operate pneumatic switch 510 to deactivate supplying pressurized air to object capture airflow generator 320 via air input port 321. Alternatively, if material obstruction sensor 350 detects an obstruction, sorting control logic and electronics 260 may respond with an airflow control signal to operate pneumatic switch 510 to deactivate supplying pressurized air to object capture airflow generator 320 via air input port 321, and instead activate supplying pressurized air to object ejection airflow generator 322 via air input port 323 to eject the obstruction from air conveyor device 122 that forms each of at least some of suction gripper mechanisms 101 using a positive pressure, ejection airflow.

It should also be understood that activation and deactivation of either object capture airflow generator 320 or object ejection airflow generator 322 may also, in some embodiments, be controlled manually by an operator (either locally or remotely) in addition to being controlled by sorting control logic and electronics 260. In some embodiments, sorting control logic and electronics 260 instead, or in addition, periodically activate object ejection airflow generator 322 even in the absence of a detected obstruction at the elapse of each ejection period (for example, every 5 minutes) to purge the system of clogs or accumulating particulates.

As alternative implementations of any of the embodiments described herein, the ejection force generated by object ejection airflow generator 322 may be augmented (or in some embodiments, even replaced) by utilizing mechanical assisted ejection. That is, a mechanical material ejector mechanism may be coupled to the housing of one or more of suction gripper mechanisms 101 that applies an outward force onto target object 55 during ejection actions to propel target object 55 away from suction gripper mechanisms 101. Such a mechanical material ejector mechanism may be actuated in addition to (e.g., to supplement) activation of object ejection airflow generator 322, or selectively instead of activating object ejection airflow generator 322.

Figure 6:
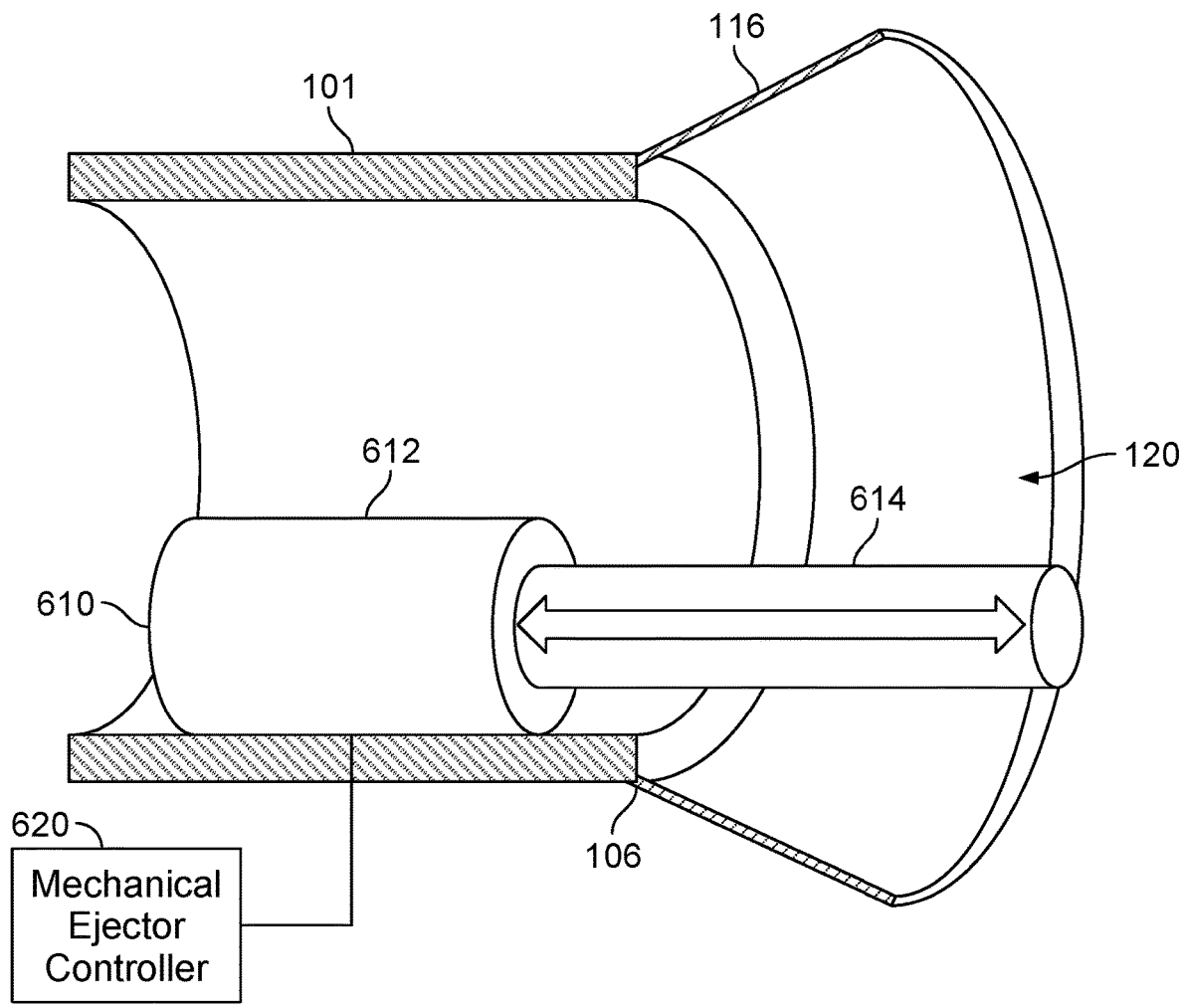
FIGS. 6 and 7 are diagrams illustrating example mechanical material ejector mechanisms in accordance with some embodiments.

FIG. 6 is a diagram illustrating an example of a mechanical material ejector mechanism in accordance with some embodiments. In the example of FIG. 6, mechanical material ejector mechanism 610 is coupled to each of at least some of suction gripper mechanisms 101 of suction gripper cluster 100 such as described herein. In some embodiments, each of at least some of suction gripper mechanisms 101 of suction gripper cluster 100 may comprise mechanical material ejector mechanism 610. In other embodiments, at least one, but fewer than all, of suction gripper mechanisms 101 of suction gripper cluster 100 may comprise mechanical material ejector mechanism 610. FIG. 6 illustrates an example mechanical material ejector mechanism 610 with a partial cut-away view of a lower portion of one of suction gripper mechanisms 101 proximate to first port 106. In this particular illustration, a cut-away view of optional converging cone attachment 116 coupled to first port 106 is shown. In this embodiment, mechanical material ejector mechanism 610 comprises actuator 612 coupled to extendable strike member 614. Actuator 612 may be either electrically or pneumatically controlled by mechanical ejector controller 620. When actuated, actuator 612 quickly projects extendable strike member 614 out from first port 106 to strike the surface of any target object 55 that may have been captured. In some embodiments, where attachment 116 is coupled to first port 106, extendable strike member 614 may have sufficient length to extend out beyond the length of any attachment 116. The force of the striking action results in a disengagement of target object 55 from suction gripper cluster 100 and propels target object 55 to the desired material deposit location as explained above. In some embodiments, actuator 612 may be implemented using a solenoid and extendable strike member 614 by a sliding piston that extends from the solenoid when the solenoid is activated, and return to a retracted position when the solenoid is deactivated. In other embodiments, actuator 612 may instead comprise a pneumatic linear actuator that extends a sliding piston when the pneumatic linear actuator is activated, and returns to a retracted position when the pneumatic linear actuator is deactivated. In some embodiments, mechanical material ejector mechanism 610 may include a spring that functions to retract extendable strike member 614 when actuator 612 is deactivated. Mechanical ejector controller 620 may be responsive to object ejection control signals initiated by sorting control logic and electronics 260. Mechanical ejector controller 620 may operate in coordinated conjunction with pneumatic switch 510, or operated by sorting control logic and electronics 260 independently from pneumatic switch 510. In other embodiments, mechanical ejector controller 620 may be an integral component of either sorting control logic and electronics 260 or pneumatic switch 510. Although mechanical material ejector mechanism 610 is shown as being secured within internal airflow passage 120, this is for illustrative purposes and other mounting locations may be used.

Figure 7:
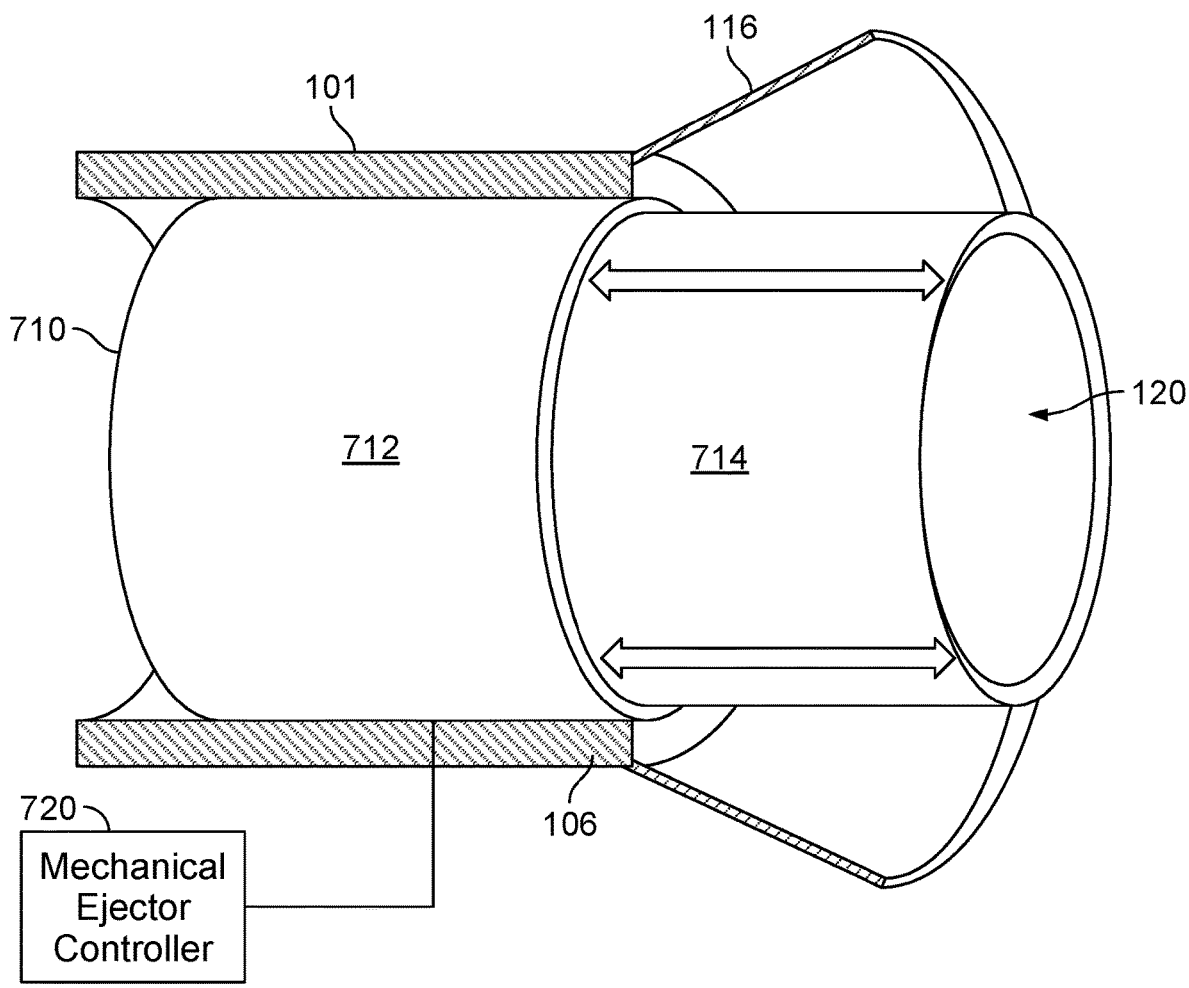

FIG. 7 is a diagram illustrating another example of a mechanical material ejector mechanism. In the example of FIG. 7, mechanical material ejector mechanism 710 is coupled to each of at least some of suction gripper mechanisms 101 of suction gripper cluster 100 such as described herein. FIG. 7 also illustrates a partial cut-away view of a lower portion of each of at least some of suction gripper mechanisms 101 proximate to first port 106, with a cut-away view of an optional converging cone attachment 116 coupled to first port 106. In this embodiment, mechanical material ejector mechanism 710 is secured to each of at least some of suction gripper mechanisms 101 within internal airflow passage 120. Mechanical material ejector mechanism 710 comprises actuator 712 coupled to extendable strike member 714. Actuator 712 may be either electrically or pneumatically controlled by mechanical ejector controller 720. When actuated, actuator 712 quickly projects extendable strike member 714 out from first port 106 to strike the surface of any target object 55 that may have been captured. In some embodiments, where attachment 116 is coupled to first port 106, extendable strike member 714 may have sufficient length to extend out beyond the length of attachment 116. The force of the striking action results in a disengagement of target object 55 from suction gripper cluster 100 and propels target object 55 to the desired material deposit location as explained above. As was the case in FIG. 6, actuator 712 may be implemented using a solenoid and extendable strike member 714 by a sliding piston that extends from the solenoid when the solenoid is activated, and returns to a retracted position when the solenoid is deactivated. In other embodiments, actuator 712 may instead comprise a pneumatic linear actuator that extends a sliding piston when the pneumatic linear actuator is activated, and returns to a retracted position when the pneumatic linear actuator is deactivated. In some embodiments, mechanical material ejector mechanism 710 may include a spring that functions to retract extendable strike member 714 when actuator 712 is deactivated. A feature distinguishing mechanical material ejector mechanism 710 from mechanical material ejector mechanism 610 of FIG. 6 is that extendable strike member 714 of FIG. 7 is a hollow member having sides that surround internal airflow passage 120 so that the airflow (whether positive or negative) flowing through internal airflow passage 120 accordingly flows through extendable strike member 714. Mechanical ejector controller 720 may be responsive to object ejection control signals initiated by sorting control logic and electronics 260. Mechanical ejector controller 720 may operate in coordinated conjunction with pneumatic switch 510, or operated by sorting control logic and electronics 260 independently from pneumatic switch 510. In other embodiments, mechanical ejector controller 720 may be an integral component of either sorting control logic and electronics 260 or pneumatic switch 510.

It should be understood that the present disclosure expressly conveys within its scope alternative embodiments where one or more of suction gripper mechanisms 101 of suction gripper cluster 100 may comprise object capture airflow generator 320, but not necessarily also comprise object ejection airflow generator 322. That is, any of the embodiments described herein may instead include suction gripper mechanisms 101 that comprise alternative unidirectional air conveyor gripper devices having an object capture airflow generator 320, without object ejection airflow generator 322. In such alternative embodiments, object ejection action may be performed by including a mechanical material ejector mechanism (such as the example mechanical material ejector mechanisms shown in FIGS. 6 and 7) or through momentum assisted ejections such as described above.

Figure 8:
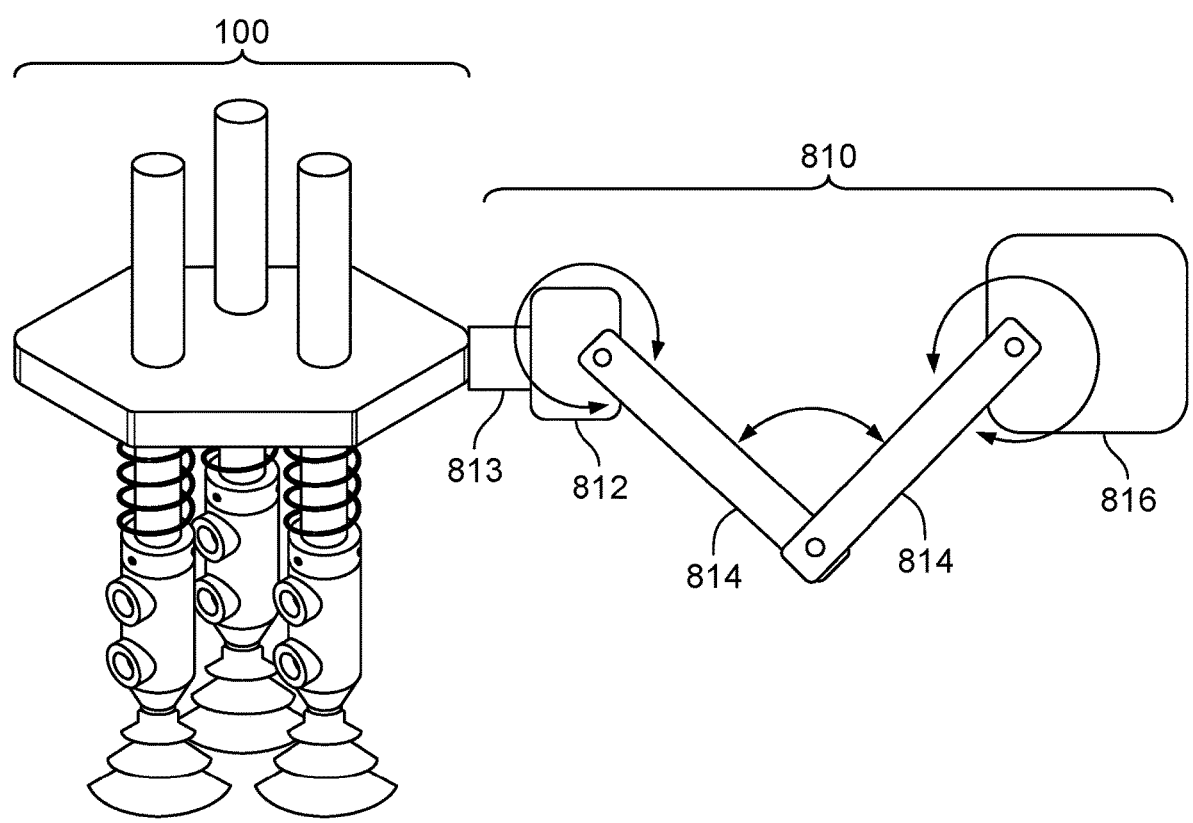
FIG. 8 is a diagram illustrating an example of a suction gripper cluster coupled to an example positioning actuator mechanism in accordance with some embodiments.

It should also be understood that the robot examples of FIGS. 2 and 2A present an example of one embodiment for utilizing and/or positioning suction gripper cluster 100 in conjunction with implementing material sorting system 200. Other embodiments may utilize other positioning actuator mechanisms to control the position of suction gripper cluster 100 during either object capture or ejection actions. For example, FIG. 8 discloses yet another example of a suction gripper cluster coupled to an example positioning actuator mechanism in accordance with some embodiments. As shown in FIG. 8, positioning actuator mechanisms 810 may comprise combinations of one or more different actuators and/or articulating members under the control of sorting control logic and electronics 260. As such, positioning actuator mechanism 810 may comprise rotational positioning mechanisms, linear positioning mechanisms, or combinations thereof. For example, positioning actuator mechanism 810 may optionally include rotator actuator 812 where suction gripper cluster 100 is pivotally coupled to rotator actuator 812 by positioning shaft 813. In some embodiments, positioning actuator mechanism 810 may be rigidly fixed to a frame or support member of material sorting system 200. In other embodiments, positioning actuator mechanism 810 may be secured to movable carrier 816 that provides linear positioning with respect to an axis or plane. In some embodiments, rotator actuator 812 may be directly mounted to movable carrier 816. In still other embodiments, one or more articulating members 814 may be used for positioning actuator mechanism 810 together with rotator actuator 812 and/or movable carrier 816 to further add additional degrees of freedom for position suction gripper cluster 100 during capture and ejection actions.

Figure 9:
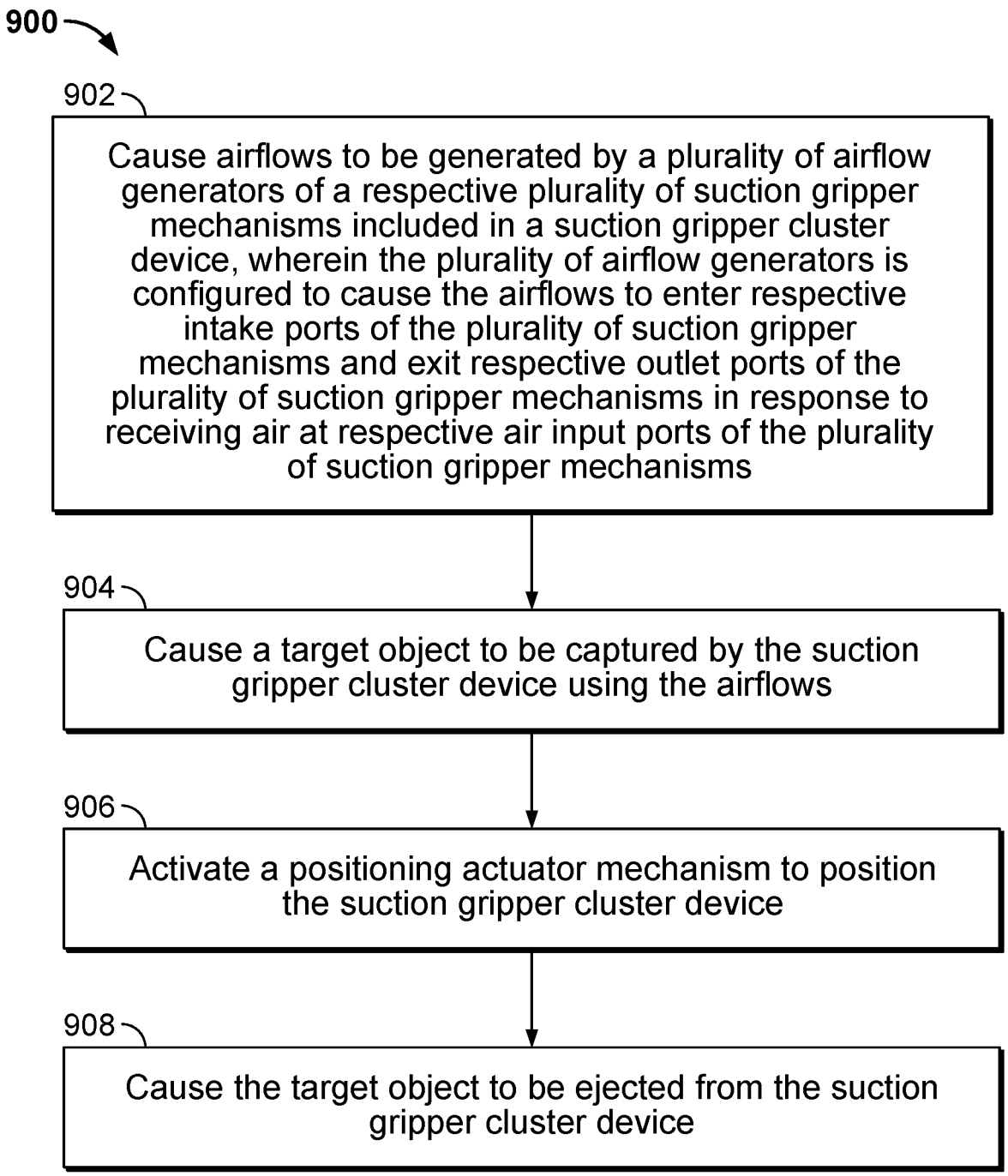
FIG. 9 is a flow diagram showing an embodiment of a process for using a suction gripper cluster to capture and eject a target object.

FIG. 9 is a flow diagram showing an embodiment of a process for using a suction gripper cluster to capture and eject a target object. In some embodiments, process 900 is implemented by sorting control logic and electronics 260 of FIG. 2 with the suction gripper cluster configuration shown in FIG. 1. It should be understood that the features and elements described herein with respect to the method 900 shown in FIG. 9 and the accompanying description may be used in conjunction with, in combination with, or substituted for elements of any of the other embodiments discussed with respect to the other figures, or elsewhere herein, and vice versa. Further, it should be understood that the functions, structures, and other descriptions of elements associated with embodiments of FIG. 9 may apply to like named or described elements for any of the other figures and embodiments and vice versa.

At 902, airflows are caused to be generated by a plurality of airflow generators of a respective plurality of suction gripper mechanisms included in a suction gripper cluster device, wherein the plurality of airflow generators is configured to cause the airflows to enter respective intake ports of the plurality of suction gripper mechanisms and exit respective outlet ports of the plurality of suction gripper mechanisms in response to receiving air at respective air input ports of the plurality of suction gripper mechanisms. In some embodiments, objects being transported by a conveyor mechanism are identified (e.g., their attribute information including material type and where they are located on the conveyor mechanism are determined). For example, objects are designated as being "target objects" if they are identified to be of a target material type and objects are designated as being "non-target objects" if they are identified to be of a material type that is not a target material type. Once a target object is identified, the sorting control logic and electronics is configured to send an airflow control signal to a pneumatic control system. In response to receiving the airflow control signal, the pneumatic control system is configured to supply pressurized air into (e.g., a selected) at least a subset of the suction gripper mechanisms that are included in a suction gripper cluster device that is located above the conveyor mechanism. In some embodiments, each of at least some of the suction gripper mechanisms of the suction gripper cluster device comprises an air conveyor device. In some embodiments, the airflow control signal indicates for example, which air input port of each one or more of the air conveyor devices of the suction gripper cluster device to which the pneumatic control system is to supply air and/or the amount of air to supply. The air supplied to the indicated air input port of the air conveyor device(s) is connected to corresponding airflow generator(s), which will channel the supplied pressurized air into a negative pressure, vacuum/suction airflow that will flow from the intake port of the air conveyor device(s) to the outlet port of the air conveyor device(s).

At 904, a target object is caused to be captured by the suction gripper cluster device using the airflows. As the target object is transported by the conveyor mechanism below the suction gripper cluster device, the generated vacuum/suction force will lift the target object off of the conveyor mechanism and towards the suction gripper mechanisms(s) of the suction gripper cluster device. The target object may become adhered to the intake port(s) (or a corresponding attachment(s) such as suction cup(s)) of suction gripper mechanisms(s). Each suction gripper mechanism (e.g., comprising a corresponding air conveyor device) comprises an independent point of contact with the target object and given that the suction gripper cluster device includes multiple suction gripper mechanisms (e.g., comprising air conveyor devices), there are multiple independent points of contact between the suction gripper cluster device and the target object. The multiple independent points of contact between the suction gripper cluster device and the target object all serve to increase the likelihood that the suction gripper cluster device will successfully capture the target object (e.g., remove the target object off of the conveyor mechanism). Additionally, because each suction gripper mechanism is designed to move independently of the other suction gripper mechanisms within a single suction gripper, the suction gripper mechanisms can flexibly comply against the surface of the target object, which also helps to increase the likelihood that the suction gripper cluster device will successfully capture the target object.

At 906, a positioning actuator mechanism is activated to position the suction gripper cluster device. After the target object has been captured by the suction gripper mechanisms(s) of the suction gripper cluster device, the sorting control logic and electronics is configured to send a position control signal to the positioning actuator mechanism that is coupled to the suction gripper cluster device. For example, the positioning actuator mechanism comprises a rotator actuator, a movable carrier, a robot, one or more articulating members, or a combination thereof. In response to the position control signal, the positioning actuator mechanism is configured to adjust, if appropriate, the current position of the suction gripper cluster device to facilitate the ejection of the captured target object into a corresponding deposit location. For example, adjusting the position of the suction gripper cluster device includes using the robotic arms of a sorting robot to place the suction gripper cluster device directly over or near (e.g., within a predetermined distance) a corresponding deposit location. For example, the corresponding deposit location of a target object is determined to correspond to the material type of the target object.

At 908, the target object is caused to be ejected from the suction gripper cluster device. The sorting control logic and electronics is configured to send an ejection control signal and/or another airflow control signal to cause suction gripper mechanism(s) to eject the target object into its corresponding deposit location. In some embodiments, where the air conveyor devices of the suction gripper cluster device comprise a respective second airflow generator that is configured to generate a positive pressure ejection airflow that flows from the outlet port of the air conveyor device to the intake port of the air conveyor device, the sorting control logic and electronics is configured to send a second airflow control signal to the pneumatic control system to cause the pneumatic control system to supply pressurized air into a respective second air input port of air conveyor devices that are connected to this second airflow generator. The ejection airflows that are then created by these second airflow generators are configured to eject the target object. In some embodiments, where each of at least some of the suction gripper mechanisms of the suction gripper cluster device comprises a mechanical material ejector mechanism, the sorting control logic and electronics is configured to send an ejection control signal to the suction gripper mechanisms to cause the respective mechanical material ejector mechanisms to extend respective strike members outward from the respective intake ports of the suction gripper mechanisms to strike the surface of the target object and therefore eject it into a corresponding deposit location. In some embodiments, the suction gripper mechanisms of the suction gripper cluster device comprise both respective second airflow generators and the mechanical material ejector mechanisms, in which the sorting control logic and electronics may be configured to send control signals to activate both the respective second airflow generators and the mechanical material ejector mechanisms to eject the target object into a corresponding deposit location.

Figure 10:
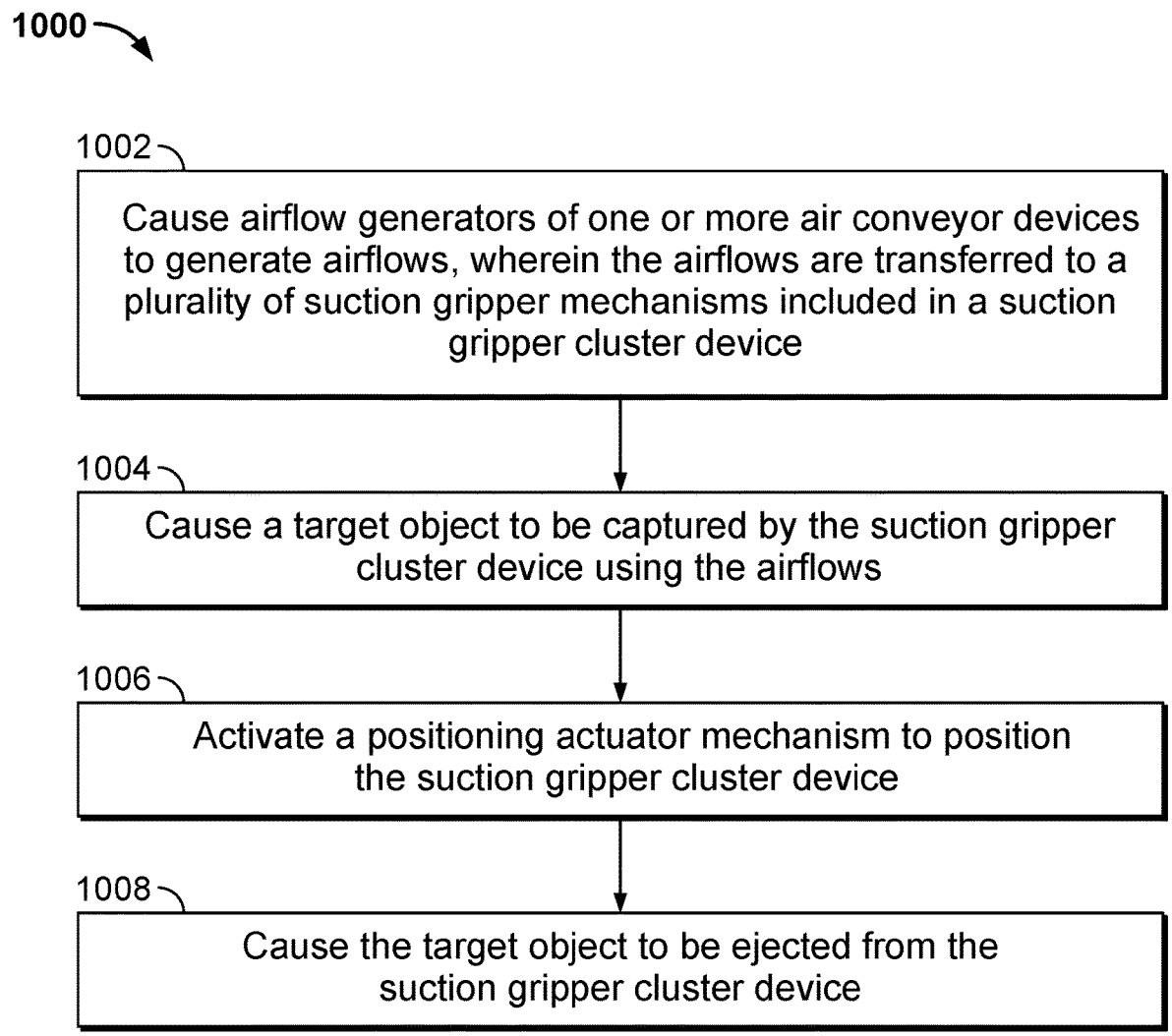
FIG. 10 is a flow diagram showing another embodiment of a process for using a suction gripper cluster to capture and eject a target object.

FIG. 10 is a flow diagram showing another embodiment of a process for using a suction gripper cluster to capture and eject a target object. In some embodiments, process 1000 is implemented by sorting control logic and electronics 260 of FIG. 2A with the suction gripper cluster configuration shown in FIG. 1D. It should be understood that the features and elements described herein with respect to the method 1000 shown in FIG. 10 and the accompanying description may be used in conjunction with, in combination with, or substituted for elements of any of the other embodiments discussed with respect to the other figures, or elsewhere herein, and vice versa. Further, it should be understood that the functions, structures, and other descriptions of elements associated with embodiments of FIG. 10 may apply to like named or described elements for any of the other figures and embodiments and vice versa.

At 1002, airflow generators of one or more air conveyor devices are caused to generate airflows, wherein the airflows are transferred to a plurality of suction gripper mechanisms included in a suction gripper cluster device. In some embodiments, objects being transported by a conveyor mechanism are identified (e.g., their attribute information including material type and where they are located on the conveyor mechanism are determined). For example, objects are designated as being "target objects" if they are identified to be of a target material type and objects are designated as being "non-target objects" if they are identified to be of a material type that is not a target material type. Once a target object is identified, the sorting control logic and electronics is configured to send an airflow control signal to a pneumatic control system. In response to receiving the airflow control signal, the pneumatic control system is configured to supply pressurized air into (e.g., a selected) at least a subset of the one or more air conveyor devices that are coupled to the pneumatic control system. The vacuum airflows that are generated by the one or more air conveyor devices are then transferred, via air connections such as tubes, to the suction gripper mechanisms that are included in a suction gripper cluster device that is located above the conveyor mechanism. As such, in some embodiments, an air conveyor device that provides airflow to each of at least some of the suction gripper mechanisms of the suction gripper cluster device is located remote from the suction gripper cluster device. In some embodiments, the airflow control signal indicates for example, which air input port of each one or more of the air conveyor devices to which the pneumatic control system is to supply air and/or the amount of air to supply. The air supplied to the indicated air input port of the air conveyor device(s) is connected to corresponding airflow generator(s), which will channel the supplied pressurized air into a negative pressure, vacuum/suction airflow that will flow from the intake port of the air conveyor device(s) to the outlet port of the air conveyor device(s).

At 1004, a target object is caused to be captured by the suction gripper cluster device using the airflows. As the target object is transported by the conveyor mechanism below the suction gripper cluster device, the generated vacuum/suction force will lift the target object off of the conveyor mechanism and towards the suction gripper cluster device. The target object may become adhered to the intake port(s) (or a corresponding attachment(s) such as suction cup(s)) of the suction gripper mechanisms. Each suction gripper mechanism comprises an independent point of contact with the target object and given that the suction gripper cluster device includes multiple suction gripper mechanisms, there are multiple independent points of contact between the suction gripper cluster device and the target object. The multiple independent points of contact between the suction gripper cluster device and the target object all serve to increase the likelihood that the suction gripper cluster device will successfully capture the target object (e.g., remove the target object off of the conveyor mechanism). Additionally, because each suction gripper mechanism is designed to move independently of the other suction gripper mechanisms within a single suction gripper, the suction gripper mechanisms can flexibly comply against the surface of the target object, which also helps to increase the likelihood that the suction gripper cluster device will successfully capture the target object.

At 1006, a positioning actuator mechanism is activated to position the suction gripper cluster device. After the target object has been captured by suction gripper mechanism(s) of the suction gripper cluster device, the sorting control logic and electronics is configured to send a position control signal to the positioning actuator mechanism that is coupled to the suction gripper cluster device. For example, the positioning actuator mechanism comprises a rotator actuator, a movable carrier, a robot, one or more articulating members, or a combination thereof. In response to the position control signal, the positioning actuator mechanism is configured to adjust, if appropriate, the current position of the suction gripper cluster device to facilitate the ejection of the captured target object into a corresponding deposit location. For example, adjusting the position of the suction gripper cluster device includes using the robotic arms of a sorting robot to place the suction gripper cluster device directly over or near (e.g., within a predetermined distance) a corresponding deposit location. For example, the corresponding deposit location of a target object is determined to correspond to the material type of the target object.

At 1008, the target object is caused to be ejected from the suction gripper cluster device. The sorting control logic and electronics is configured to send an ejection control signal and/or another airflow control signal to cause the air conveyor device(s) to eject the target object into its corresponding deposit location. In some embodiments, where the air conveyor devices comprise a respective second airflow generator that is configured to generate a positive pressure ejection airflow that flows from the outlet port of the air conveyor device to the intake port of the air conveyor device, the sorting control logic and electronics is configured to send a second airflow control signal to the pneumatic control system to cause the pneumatic control system to supply pressurized air into a respective second air input port of air conveyor devices that are connected to this second airflow generator. The ejection airflows that are then created by these second airflow generators are delivered to the suction gripper mechanisms and used to eject the target object. In some embodiments, where each of at least some of the suction gripper mechanisms of the suction gripper cluster device comprises a mechanical material ejector mechanism, the sorting control logic and electronics is configured to send an ejection control signal to the suction gripper mechanisms to cause the respective mechanical material ejector mechanisms to extend respective strike members outward from the respective intake ports of the suction gripper mechanisms to strike the surface of the target object and therefore eject it into a corresponding deposit location. In some embodiments, the suction gripper mechanisms of the suction gripper cluster device are operable to provide both the ejection airflow and the mechanical material ejector mechanisms, in which the sorting control logic and electronics may be configured to send control signals to activate both the respective second airflow generators and the mechanical material ejector mechanisms to eject the target object into a corresponding deposit location.

Figure 11:
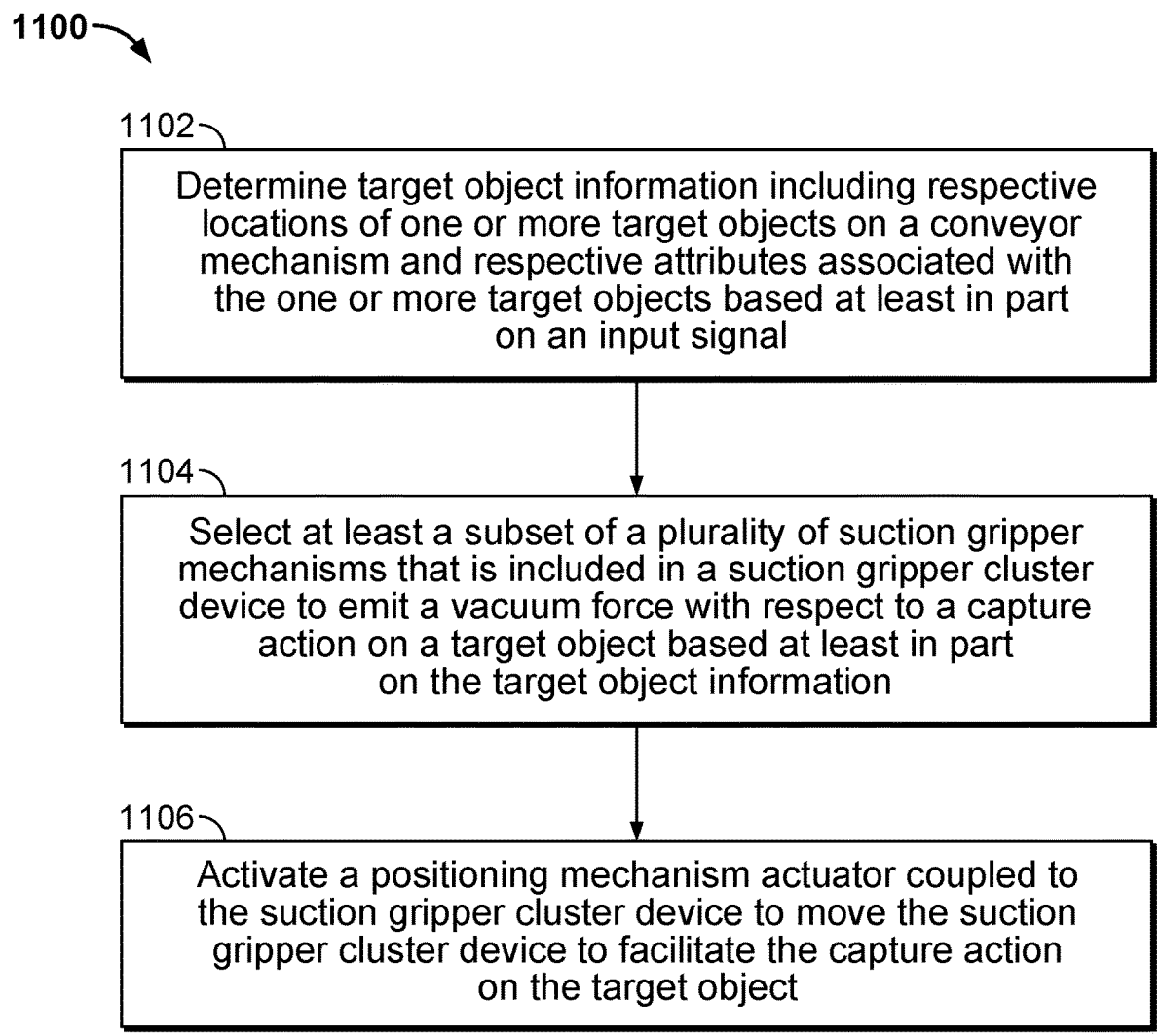
FIG. 11 is a flow diagram showing an example of a process for using a suction gripper cluster to perform a capture action on a target object.

FIG. 11 is a flow diagram showing an example of a process for using a suction gripper cluster device to perform a capture action on a target object. In some embodiments, process 1100 is implemented by sorting control logic and electronics 260 of FIG. 2 or FIG. 2A. In some embodiments, steps 902 and 904 of process 900 of FIG. 9 may be implemented using, at least in part, process 1000. In some embodiments, steps 1002 and 1004 of process 1000 of FIG. 10 may be implemented using, at least in part, process 1100.

At 1102, target object information including respective locations of one or more target objects on a conveyor mechanism and respective attributes associated with the one or more target objects is determined based at least in part on an input signal. For example, based on one or more images of objects that are being transported by a conveyor mechanism, those objects that are target objects and their locations on the conveyor mechanism are determined. The attributes of the target objects, such as, for example, the dimensions and material type of the target objects are also determined.

At 1104, at least a subset of a plurality of suction gripper mechanisms that are included in a suction gripper cluster device is selected to emit a vacuum force with respect to a capture action on a target object based at least in part on the target object information. While the entire suction gripper cluster device is actuated (e.g., lowered) towards a target object during a capture action, in some embodiments, only a subset of the suction gripper mechanisms (e.g., each comprising an air conveyor device or receiving airflows provided by one or more air conveyor devices) that are included in a suction gripper cluster device is selected to perform a capture action on at least one of the identified target objects. In some embodiments, the suction gripper mechanisms(s) are selected for a target object based on, for example: the current location(s) of suction gripper mechanisms(s) over the conveyor mechanism, the location arrangement of the suction gripper mechanisms(s) among the arrangement of all suction gripper mechanisms within the suction gripper cluster device, the location of the target object on the conveyor mechanism, the shape(s)/size(s) of the suction gripper mechanisms(s), the shape/size of the target object, and/or the material type of the target object.

At 1106, a positioning mechanism actuator coupled to the suction gripper cluster device is activated to move the suction gripper cluster device to facilitate the capture action on the target object. The positioning mechanism actuator that is coupled to the suction gripper cluster device is instructed by a position control signal from the sorting control logic and electronics to move the suction gripper cluster device closer to the target object and/or the suction gripper cluster in a manner that will allow the suction gripper cluster device to be better aligned with the target object (e.g., such that the suction gripper cluster device will be directly over the target object) to capture the target object. For example, the position control signal may include parameters such as a desired angle to which to rotate the suction gripper cluster device, a destination coordinate to which the suction gripper cluster device is to be moved, and/or a desired height over the surface of the conveyor mechanism to which the suction gripper cluster device is to be moved. After the suction gripper cluster device is repositioned, the suction gripper cluster device may be lowered towards the target object at least concurrently with the selected suction gripper mechanisms emitting a vacuum airflow to capture the target object.

It should be understood that components, elements and features of any of the embodiments described herein may be used in combination. Moreover, it should be understood that in some embodiments, material sorting system 200 may be used in combination or in conjunction with other sorting system technologies. As such, other embodiments are intended to include sorting systems that may comprise combinations of suction grippers, vacuum extraction devices, and other material sorting technologies.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A suction gripper cluster device, comprising:
   a mounting assembly coupled to a positioning actuator mechanism; and
   a plurality of suction gripper mechanisms coupled to the mounting assembly, wherein the plurality of suction gripper mechanisms comprises a first suction gripper mechanism that includes:
   a first linear shaft element coupled to the mounting assembly, wherein the first linear shaft element is operable to travel through the mounting assembly; and
   a first air conveyor device coupled to the first linear shaft element, wherein the first air conveyor device comprises:
   a housing that includes an intake port and an outlet port;
   an air input port; and
   an airflow generator defined within the housing, wherein the airflow generator is coupled to the air input port, wherein the airflow generator is configured to cause an airflow to enter the intake port and exit the outlet port in response to a supply of air into the air input port; and
   wherein a first subset of the plurality of suction gripper mechanisms is selected to emit a vacuum force during a capture action to collectively capture a target object based at least in part on detected attribute information of the target object; and
   wherein a second subset of the plurality of suction gripper mechanisms is not selected to emit the vacuum force during the capture action to collectively capture the target object based at least in part on the detected attribute information of the target object.

2. The suction gripper cluster device of claim 1, wherein the airflow generator comprises:
   an air distribution ring disposed within the housing of the first air conveyor device, wherein the air distribution ring is coupled to the air input port; and a plurality of air ejector nozzles disposed around the air distribution ring, wherein the plurality of air ejector nozzles is positioned within the housing to direct air entering the air distribution ring from the air input port in a direction away from the intake port and towards the outlet port.

3. The suction gripper cluster device of claim 1, wherein the airflow generator comprises a first airflow generator, wherein the airflow comprises a first airflow, wherein the supply of air comprises a first supply of air, wherein the air input port comprises a first air input port, and wherein the first air conveyor device further comprises:
  a second airflow generator configured to cause a second airflow to enter a second air input port and exit from the intake port in response to a second supply of air into the second air input port.

4. The suction gripper cluster device of claim 3, wherein the second airflow generator comprises:
  a second air distribution ring disposed within the housing of the first air conveyor device, wherein the second air distribution ring is coupled to the second air input port; and
  a second plurality of air ejector nozzles disposed around the second air distribution ring, wherein the second plurality of air ejector nozzles is positioned within the housing to direct air entering the second air distribution ring from the second air input port in a direction away from the outlet port and towards the intake port.

5. The suction gripper cluster device of claim 1, wherein the first suction gripper mechanism comprises a material obstruction sensor that is configured to output a feedback signal.

6. The suction gripper cluster device of claim 1, wherein the first suction gripper mechanism is secured to the mounting assembly within a linear bearing, wherein the first linear shaft element of the first suction gripper mechanism is positioned within the linear bearing and configured to move axially with respect to an axis of the linear bearing.

7. The suction gripper cluster device of claim 1, further comprising:
  a spring mechanism positioned between the mounting assembly and a stop device secured around the first linear shaft element, wherein the spring mechanism is configured to exert a force against the stop device to extend the first linear shaft element to an extended position.

8. The suction gripper cluster device of claim 1, wherein the first air conveyor device is integrated with the first linear shaft element.

9. The suction gripper cluster device of claim 1, wherein the first air conveyor device is located remotely to the suction gripper cluster device.

10. The suction gripper cluster device of claim 1, further comprising an attachment attached to the intake port.

11. The suction gripper cluster device of claim 10, wherein the attachment attached to the intake port comprises a suction cup assembly.

12. The suction gripper cluster device of claim 1, wherein the mounting assembly comprises one or more mounting points configured to pivotally couple to the positioning actuator mechanism.

13. The suction gripper cluster device of claim 12, wherein the positioning actuator mechanism comprises: a rotational positioning mechanism, a linear positioning mechanism, and a robot mechanism.

14. The suction gripper cluster device of claim 1, wherein the first suction gripper mechanism comprises a mechanical material ejector mechanism, wherein the mechanical material ejector mechanism comprises an actuator coupled to an extendable strike member, wherein the mechanical material ejector mechanism is configured to activate the extendable strike member to extend from the intake port in response to a control signal.

15. The suction gripper cluster device of claim 1, wherein an internal through-passageway connects the intake port and the outlet port and wherein the internal through-passageway defines a common air channel through the first linear shaft element and the first air conveyor device.

16. The suction gripper cluster device of claim 1, wherein the mounting assembly comprises one or more mounting points that mate with corresponding socket elements of the positioning actuator mechanism, and wherein the positioning actuator mechanism comprises a plurality of robotic arms.

17. A system, comprising:
  a mounting assembly coupled to a positioning actuator mechanism;
  a suction gripper cluster device comprising a plurality of suction gripper mechanisms, wherein the plurality of suction gripper mechanisms comprises a first suction gripper mechanism and a second suction gripper mechanism, wherein the first suction gripper mechanism comprises a first linear shaft element coupled to the mounting assembly, wherein the first linear shaft element is operable to travel through the mounting assembly;
  a processor configured to:
    select a first subset of the plurality of suction gripper mechanisms to emit a vacuum force during a capture action to collectively capture a target object based at least in part on detected attribute information of the target object, wherein a second subset of the plurality of suction gripper mechanisms is not selected to emit the vacuum force during the capture action to collectively capture the target object based at least in part on the detected attribute information of the target object;
    cause airflows to be generated by a plurality of airflow generators of the first subset of the plurality of suction gripper mechanisms included in the suction gripper cluster device, wherein the plurality of airflow generators is configured to cause the airflows to enter respective intake ports of the first subset of the plurality of suction gripper mechanisms and exit respective outlet ports of the respective first subset of the plurality of suction gripper mechanisms in response to receiving air at a respective air input port of the respective first subset of the plurality of suction gripper mechanisms;
    cause the target object to be captured by at least the first subset of the plurality of suction gripper mechanisms included in the suction gripper cluster device using the airflows;
    activate the positioning actuator mechanism to position the suction gripper cluster device; and
    cause the target object to be ejected from the suction gripper cluster device; and
  a memory coupled to the processor and configured to provide the processor with instructions.

18. The system of claim 17, wherein the processor causing the target object to be captured by the suction gripper cluster device comprises to:
  determine target object information including respective locations of one or more target objects on a conveyor mechanism and respective attributes associated with the one or more target objects based at least in part on an input signal; and activate the positioning actuator mechanism coupled to the suction gripper cluster device to move the suction gripper cluster device to facilitate the capture action on the target object.

19. The system of claim 17, wherein the processor is further configured to cause the airflows to be deactivated.

20. The system of claim 17, wherein the target object is caused to be ejected from the suction gripper cluster device at least partially concurrently with the activating of the positioning actuator mechanism.

21. The system of claim 17, wherein the processor is further configured to cause the target object to be ejected from the suction gripper cluster device comprises activating a mechanical material ejector mechanism coupled to the suction gripper cluster device.

22. A system, comprising:
- a mounting assembly coupled to a positioning actuator mechanism;
- a suction gripper cluster device comprising a plurality of suction gripper mechanisms, wherein the plurality of suction gripper mechanisms comprises a first suction gripper mechanism and a second suction gripper mechanism, wherein the first suction gripper mechanism comprises a first linear shaft element coupled to the mounting assembly, wherein the first linear shaft element is operable to travel through the mounting assembly;
- a processor configured to:
  - select a first subset of the plurality of suction gripper mechanisms to emit a vacuum force during a capture action to collectively capture a target object based at least in part on detected attribute information of the target object, wherein a second subset of the plurality of suction gripper mechanisms is not selected to emit the vacuum force during the capture action to collectively capture the target object based at least in part on the detected attribute information of the target object;
  - cause airflow generators of one or more air conveyor devices to generate airflows, wherein the airflows are transferred to the first subset of the plurality of suction gripper mechanisms included in the suction gripper cluster device;
  - cause the target object to be captured by at least the first subset of the plurality of suction gripper mechanisms included in the suction gripper cluster device using the airflows;
  - activate the positioning actuator mechanism to position the suction gripper cluster device; and
  - cause the target object to be ejected from the suction gripper cluster device; and
- a memory coupled to the processor and configured to provide the processor with instructions.

* * * * *